United States Patent
Raghavan et al.

(10) Patent No.: US 11,785,563 B2
(45) Date of Patent: Oct. 10, 2023

(54) SYNCHRONIZATION SIGNAL BLOCK MAPPING ACROSS DIFFERENT FREQUENCIES

(71) Applicant: QUALCOMM Incorporated, San Diego, CA (US)

(72) Inventors: Vasanthan Raghavan, West Windsor Township, NJ (US); Srinivas Yerramalli, Hyderabad (IN); Arumugam Chendamarai Kannan, San Diego, CA (US); Tao Luo, San Diego, CA (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 17/370,981

(22) Filed: Jul. 8, 2021

(65) Prior Publication Data
US 2022/0022145 A1    Jan. 20, 2022

Related U.S. Application Data

(60) Provisional application No. 63/052,268, filed on Jul. 15, 2020.

(51) Int. Cl.
*H04W 56/00* (2009.01)
*H04W 16/28* (2009.01)
(Continued)

(52) U.S. Cl.
CPC ......... *H04W 56/001* (2013.01); *H04W 16/28* (2013.01); *H04W 24/08* (2013.01);
(Continued)

(58) Field of Classification Search
CPC ... H04W 56/001; H04W 16/28; H04W 24/08; H04W 72/0453; H04W 72/1263; H04W 72/23; H04B 7/0617
(Continued)

(56) References Cited

U.S. PATENT DOCUMENTS

| | | |
|---|---|---|
| 2019/0208479 A1 | 7/2019 | Kim et al. |
| 2020/0037301 A1 | 1/2020 | Park |

(Continued)

FOREIGN PATENT DOCUMENTS

| | | |
|---|---|---|
| EP | 3478004 A1 | 5/2019 |
| WO | WO-2019160652 A1 | 8/2019 |

OTHER PUBLICATIONS

Partial International Search Report—PCT/US2021/041086—ISA/EPO—dated Oct. 14, 2021.
(Continued)

*Primary Examiner* — Rownak Islam
(74) *Attorney, Agent, or Firm* — Arun Swain

(57) ABSTRACT

Methods, systems, and devices for wireless communications are described. A user equipment (UE) may receive a mapping between a set of synchronization signal block resources and a set of operating frequencies within a frequency band. The UE may identify a parameter of a synchronization signal block based on an operating frequency of the set of operating frequencies for conveying the synchronization signal block and a direction of a beam for conveying the synchronization signal block. The parameter may include an index of the synchronization signal block. The UE may monitor for the synchronization signal block based on the identified parameter.

28 Claims, 15 Drawing Sheets

(51) Int. Cl.
   *H04W 72/1263* (2023.01)
   *H04W 72/0453* (2023.01)
   *H04W 24/08* (2009.01)
   *H04W 72/23* (2023.01)

(52) U.S. Cl.
   CPC ... *H04W 72/0453* (2013.01); *H04W 72/1263* (2013.01); *H04W 72/23* (2023.01)

(58) Field of Classification Search
   USPC .......................................................... 370/329
   See application file for complete search history.

(56) References Cited

U.S. PATENT DOCUMENTS

| | | | |
|---|---|---|---|
| 2020/0092843 A1* | 3/2020 | Yang | H04W 68/02 |
| 2020/0336194 A1* | 10/2020 | Karjalainen | H04W 24/10 |
| 2021/0184750 A1* | 6/2021 | Gao | H04W 56/001 |
| 2022/0123879 A1* | 4/2022 | Munier | H04W 56/001 |
| 2022/0271818 A1* | 8/2022 | Svendsen | H04B 7/0897 |

OTHER PUBLICATIONS

International Search Report and Written Opinion—PCT/US2021/041086—ISA/EPO—dated Feb. 24, 2022.

\* cited by examiner

SYNCHRONIZATION SIGNAL BLOCK MAPPING ACROSS DIFFERENT FREQUENCIES

CROSS REFERENCE

The present application for patent claims the benefit of U.S. Provisional Patent Application No. 63/052,268 by Raghavan et al., entitled "SYNCHRONIZATION SIGNAL BLOCK MAPPING ACROSS DIFFERENT FREQUENCIES," filed Jul. 15, 2020, assigned to the assignee hereof, and expressly incorporated by reference herein.

FIELD OF TECHNOLOGY

The following relates generally to wireless communications and more specifically to synchronization signal block (SSB) mapping across different frequencies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may use support beamformed communications using one or multiple antenna subarrays to provide transmit diversity and receive diversity.

SUMMARY

The described techniques relate to improved methods, systems, devices, and apparatuses that support synchronization signal block (SSB) mapping across different frequencies. Generally, the described techniques provide for dynamically mapping SSB resources as a function of frequency and for reporting the mapping.

A method of wireless communication at a UE is described. The method may include receiving a mapping between a set of SSB resources and a set of operating frequencies within a frequency band, identifying a parameter of a SSB based on an operating frequency of the set of operating frequencies for conveying the SSB and a direction of a beam for conveying the SSB, and monitoring for the SSB based on the identified parameter.

An apparatus for wireless communication at a UE is described. The apparatus may include a processor, memory coupled with the processor, and instructions stored in the memory. The instructions may be executable by the processor to cause the apparatus to receive a mapping between a set of SSB resources and a set of operating frequencies within a frequency band, identify a parameter of a SSB based on an operating frequency of the set of operating frequencies for conveying the SSB and a direction of a beam for conveying the SSB, and monitor for the SSB based on the identified parameter.

Another apparatus for wireless communication at a UE is described. The apparatus may include means for receiving a mapping between a set of SSB resources and a set of operating frequencies within a frequency band, identifying a parameter of a SSB based on an operating frequency of the set of operating frequencies for conveying the SSB and a direction of a beam for conveying the SSB, and monitoring for the SSB based on the identified parameter.

A non-transitory computer-readable medium storing code for wireless communication at a UE is described. The code may include instructions executable by a processor to receive a mapping between a set of SSB resources and a set of operating frequencies within a frequency band, identify a parameter of a SSB based on an operating frequency of the set of operating frequencies for conveying the SSB and a direction of a beam for conveying the SSB, and monitor for the SSB based on the identified parameter.

In some examples of the method, apparatuses, and non-transitory computer-readable medium described herein, identifying the parameter of the SSB may include operations, features, means, or instructions for identifying an index of the SSB within a SSB set based on the frequency band and the direction, where monitoring for the SSB may be based on identifying the index.

Some examples of the method, apparatuses, and non-transitory computer-readable medium described herein may further include operations, features, means, or instructions for identifying the operating frequency of the set of operating frequencies used to convey the SSB, where identifying the parameter may be based on identifying the operating frequency of the set of operating frequencies.

Some examples of the method, apparatuses, and non-transitory computer-readable medium described herein may further include operations, features, means, or instructions for identifying the frequency band and the direction of the beam based on receiving of the mapping, where the identifying of the parameter may be based on identifying the frequency band and the direction.

In some examples of the method, apparatuses, and non-transitory computer-readable medium described herein, receiving the mapping may include operations, features, means, or instructions for receiving the mapping from a base station, the mapping further including an association between the set of operating frequencies within the frequency band and parameters of SSBs conveyed using the set of operating frequencies included in the mapping.

In some examples of the method, apparatuses, and non-transitory computer-readable medium described herein, the parameters include SSB indices associated with the set of operating frequencies within the frequency band.

Some examples of the method, apparatuses, and non-transitory computer-readable medium described herein may further include operations, features, means, or instructions for transmitting, to a base station, a message indicating the mapping, where the mapping further includes an association between the set of operating frequencies within the frequency band and parameters of SSBs conveyed using the set of operating frequencies included in the mapping.

Some examples of the method, apparatuses, and non-transitory computer-readable medium described herein may further include operations, features, means, or instructions for transmitting an indication of an operating frequency of the set of operating frequencies that may be used to report beam measurements, where the indication may be included in the message.

Some examples of the method, apparatuses, and non-transitory computer-readable medium described herein may further include operations, features, means, or instructions for identifying a set of reference signal resources associated with the SSB in the frequency band based on the mapping and the operating frequency, and communicating information using the set of reference signal resources.

Some examples of the method, apparatuses, and non-transitory computer-readable medium described herein may further include operations, features, means, or instructions for determining that the operating frequency of the set of operating frequencies satisfies a criterion, where the set of reference signal resources may be associated with the operating frequency.

Some examples of the method, apparatuses, and non-transitory computer-readable medium described herein may further include operations, features, means, or instructions for identifying, based on the received mapping, a first gain associated with a first operating frequency of the set of operating frequencies and the direction of the beam and a second gain associated with a second operating frequency of the set of operating frequencies and a second direction of a second beam, where identifying the parameter may be based on identifying the first gain and the second gain.

Some examples of the method, apparatuses, and non-transitory computer-readable medium described herein may further include operations, features, means, or instructions for transmitting a request for the mapping, where receiving the mapping may be based on transmitting the request.

Some examples of the method, apparatuses, and non-transitory computer-readable medium described herein may further include operations, features, means, or instructions for identifying, based on receiving the mapping, an offset between the parameter of the SSB conveyed using a first operating frequency of the frequency band relative to a second parameter of a second SSB conveyed using a second operating frequency of the frequency band, where monitoring for the SSB may be based on identifying the offset.

Some examples of the method, apparatuses, and non-transitory computer-readable medium described herein may further include operations, features, means, or instructions for communicating information using the operating frequency of the set of operating frequencies based on the monitoring for the SSB.

In some examples of the method, apparatuses, and non-transitory computer-readable medium described herein, the mapping may be included in a system information block (SIB), a master information block (MIB), radio resource control (RRC) signaling, downlink control information (DCI), or a combination thereof, and the mapping includes an indication of one or more groups of SSBs and one or more sets of SSBs of the one or more groups of the SSBs.

In some examples of the method, apparatuses, and non-transitory computer-readable medium described herein, the SSB may be conveyed over a first set of the set of SSB resources using the frequency band.

A method of wireless communication at a base station is described. The method may include transmitting a mapping between a set of SSB resources and a set of operating frequencies within a frequency band, identifying a parameter of a SSB based on an operating frequency of the set of operating frequencies for conveying the SSB and a direction of a beam for conveying the SSB, and transmitting the SSB based on the identified parameter.

An apparatus for wireless communication at a base station is described. The apparatus may include a processor, memory coupled with the processor, and instructions stored in the memory. The instructions may be executable by the processor to cause the apparatus to transmit a mapping between a set of SSB resources and a set of operating frequencies within a frequency band, identify a parameter of a SSB based on an operating frequency of the set of operating frequencies for conveying the SSB and a direction of a beam for conveying the SSB, and transmit the SSB based on the identified parameter.

Another apparatus for wireless communication at a base station is described. The apparatus may include means for transmitting a mapping between a set of SSB resources and a set of operating frequencies within a frequency band, identifying a parameter of a SSB based on an operating frequency of the set of operating frequencies for conveying the SSB and a direction of a beam for conveying the SSB, and transmitting the SSB based on the identified parameter.

A non-transitory computer-readable medium storing code for wireless communication at a base station is described. The code may include instructions executable by a processor to transmit a mapping between a set of SSB resources and a set of operating frequencies within a frequency band, identify a parameter of a SSB based on an operating frequency of the set of operating frequencies for conveying the SSB and a direction of a beam for conveying the SSB, and transmit the SSB based on the identified parameter.

In some examples of the method, apparatuses, and non-transitory computer-readable medium described herein, identifying the parameter of the SSB may include operations, features, means, or instructions for identifying an index of the SSB within a SSB set based on the frequency band and the direction, where transmitting the SSB may be based on identifying the index.

Some examples of the method, apparatuses, and non-transitory computer-readable medium described herein may further include operations, features, means, or instructions for identifying the operating frequency of the set of operating frequencies used to convey the SSB, where identifying the parameter may be based on identifying the operating frequency of the set of operating frequencies.

Some examples of the method, apparatuses, and non-transitory computer-readable medium described herein may further include operations, features, means, or instructions for identifying the frequency band and the direction associated with the beam based on the mapping, where the identifying of the parameter may be based on identifying the frequency band and the direction.

In some examples of the method, apparatuses, and non-transitory computer-readable medium described herein, transmitting the mapping may include operations, features, means, or instructions for transmitting the mapping to a user equipment, the mapping further including an association between the set of operating frequencies within the frequency band and parameters of SSBs conveyed using the set of operating frequencies included in the mapping.

In some examples of the method, apparatuses, and non-transitory computer-readable medium described herein, the parameters include SSB indices associated with the set of operating frequencies within the frequency band.

Some examples of the method, apparatuses, and non-transitory computer-readable medium described herein may further include operations, features, means, or instructions for receiving, from a user equipment, a message indicating the mapping, where the mapping further includes an association between the set of operating frequencies within the frequency band and parameters of SSBs conveyed using the set of operating frequencies included in the mapping.

Some examples of the method, apparatuses, and non-transitory computer-readable medium described herein may further include operations, features, means, or instructions for receiving an indication of an operating frequency of the set of operating frequencies that may be used to report beam measurements, where the indication may be included in the message.

Some examples of the method, apparatuses, and non-transitory computer-readable medium described herein may further include operations, features, means, or instructions for identifying, based on the mapping, a first gain associated with a first operating frequency of the set of operating frequencies and the direction of the beam and a second gain associated with a second operating frequency of the set of operating frequencies and a second direction of a second beam, where identifying the parameter may be based on identifying the first gain and the second gain.

Some examples of the method, apparatuses, and non-transitory computer-readable medium described herein may further include operations, features, means, or instructions for receiving, from a user equipment, a request for the mapping, where transmitting the mapping may be based on transmitting the request.

Some examples of the method, apparatuses, and non-transitory computer-readable medium described herein may further include operations, features, means, or instructions for identifying an offset between the parameter of the SSB conveyed using a first operating frequency of the frequency band relative to a second parameter of a second SSB conveyed using a second operating frequency of the frequency band, where transmitting the mapping may be based on identifying the offset.

Some examples of the method, apparatuses, and non-transitory computer-readable medium described herein may further include operations, features, means, or instructions for communicating information using the operating frequency of the set of operating frequencies based on monitoring for the SSB.

In some examples of the method, apparatuses, and non-transitory computer-readable medium described herein, the mapping may be included in a SIB, a MIB, RRC signaling, DCI, or a combination thereof, and the mapping includes an indication of one or more groups of SSBs and one or more sets of SSBs of the one or more groups of the SSBs.

In some examples of the method, apparatuses, and non-transitory computer-readable medium described herein, the SSB may be conveyed over a first set of the set of SSB resources using the frequency band.

DETAILED DESCRIPTION

Figure 1:
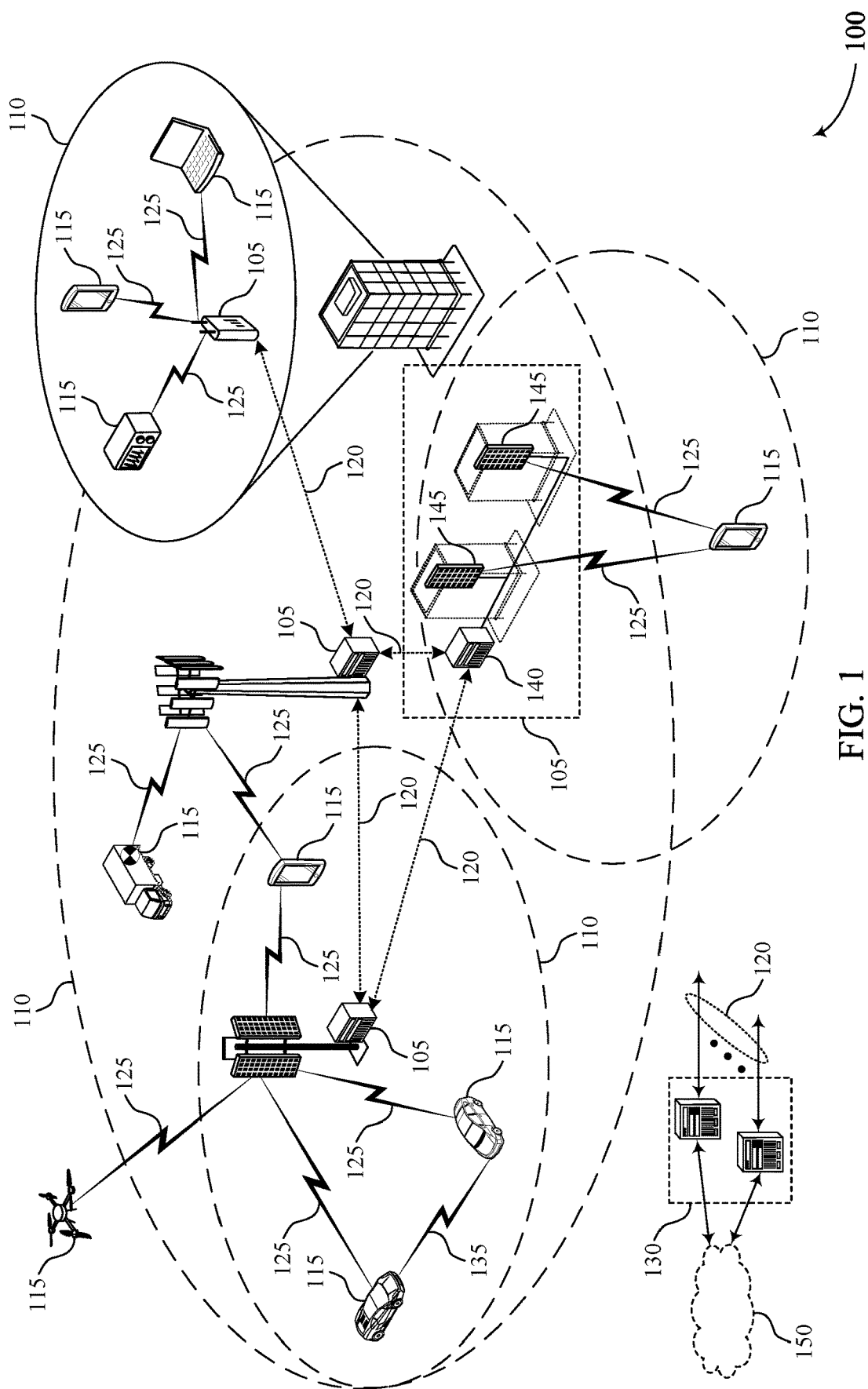
FIG. 1 illustrates an example of a system for wireless communications that supports synchronization signal block (SSB) mapping across different frequencies in accordance with aspects of the present disclosure.

Some wireless communications systems may support beamformed transmissions in different frequency bands, such as FR1 (410 MHz-7.125 GHz), FR2 (24.25 GHz-52.6 GHz), FR4 (52.6 GHz-114.25 GHz), FR3 (7.125 GHz-24.25 GHz), or combinations thereof to take advantage of increased performance, such as increased data rates and increased beamforming gains. In some cases, an ultra-wide bandwidth range (e.g., 14 GHz wide) at the upper millimeter wave bands (e.g., FR4) may be utilized across multiple sets of operating frequencies (e.g., 57 GHz to 71 GHz) within the frequency band, which may provide performance and beamforming gains. For example, in some devices, a single radio frequency (RF) chain may be used over an ultra-wide bandwidth range at the upper millimeter wave bands (e.g., FR4 frequency bands). However, for beamformed transmissions in an ultra-wide bandwidth range at the upper millimeter wave bands, performance (e.g., array gain performance relative to beam direction) may vary between different operating frequencies (e.g., carrier frequencies). For example, variations between different operating frequencies in the FR4 frequency band may be more pronounced than variations between different operating frequencies in the FR1 frequency band or the FR2 frequency band. Accordingly, in beamformed transmissions at the upper millimeter wave bands, SSBs associated with (e.g., pointing to, mapped to) a given set of SSB resources at a first operating frequency may be associated with a different set of SSB resources when operating at a second operating frequency (e.g., SSBs may drift apart as a function of frequency).

Techniques are described for mapping SSB resources based on operating frequencies being used within a frequency band and an angle of a beamformed transmission. A user equipment (UE) may receive an indication including a mapping that associates one or more sets of SSB resources with operating frequencies within a frequency band (e.g., FR4) and a direction of a beamformed transmission. In some examples, the indication may be received in a system information block (SIB), a master information block (MIB), radio resource control (RRC) signaling, and/or downlink control information (DCI). The UE may identify an operating frequency and a direction associated with a beam for communicating information based on receiving the indication. In some aspects, the UE may identify a parameter (e.g., an SSB index) of an SSB conveyed using the frequency band and the direction associated with the beam. In some examples, for a given operating frequency in the frequency band and the direction associated with the beam, the UE may identify the corresponding parameter (e.g., SSB index).

Aspects of the disclosure are initially described in the context of a wireless communications system. Examples of processes and signaling exchanges that support SSB mapping across different frequencies are then described. Aspects of the disclosure are further illustrated by and described with reference to apparatus diagrams, system diagrams, and flowcharts that relate to SSB mapping across different frequencies.

FIG. 1 illustrates an example of a wireless communications system 100 that supports SSB mapping across different frequencies in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a quantity of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas.

Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the quantity of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 may support beamforming for communications between base stations 105 and UEs 115. Beamforming may be used to improve link margin deteriorated due to path, penetration, and blockage losses. The base stations 105 and the UEs 115 may be configured with multiple antenna modules to provide a uniform coverage area for the beamformed communications. An antenna module may include one or more antenna subarrays that the base stations 105 and the UEs 115 may use to form directional beams.

A directional beam may be steered over one or multiple directions (e.g., angles), and directional beam scanning (e.g., as part of a beam refinement procedure) may be used to establish a communication link 125 between a base station 105 and a UE 115. A base station 105 may transmit multiple SSBs over a predefined bandwidth in predefined symbols (e.g., OFDM symbols) of a slot or TTI. Each SSB may occupy a predefined period of time (e.g., 5 ms) of an SSB period and be transmitted by the base station 105 according to an interval, and the base station 105 may repeat transmission of the SSBs at each SSB period. The UE 115 may receive one or more synchronization signals of an SSB and may use the received information to establish communications with base station 105 via an uplink message.

In the wireless communications system 100, each of the SSBs may be associated with an SSB index (e.g., a numerical identifier) allocated by the wireless communications system 100. The SSB indices may be included, for example, in a table. In some cases, the base station 105 may transmit each SSB via a beam in a beam direction (e.g., the base station 105 may transmit a first SSB via a beam radiated in a first beam direction and the base station 105-a may transmit a second SSB via a beam radiated in a second beam direction). The UE 115 may measure the signal strength of each SSB the UE 115 detects over a time period (a time period equal to one SSB set). Based on the measured signal strengths, the UE 115 may identify the corresponding SSB and SSB index having the highest signal strength. The UE 115 may identify the SSB having the highest signal strength as being associated with the best beam for the UE 115. In some cases, each SSB may include a physical broadcast channel (PBCH). For each SSB, the SSB index of the SSB may be carried in multiple parts, over a PBCH reference signal (e.g., PBCH demodulation reference signal (DMRS)) and a PBCH payload of the SSB.

The wireless communications system 100 may support higher frequency bands, such as FR2, FR4, or other frequencies above 24.25 GHz. Antenna subarrays may support communications at these higher frequency ranges. For example, an antenna subarray configured for communications at these high frequency ranges may have an inter-element spacing of $\lambda/2$, in which $\lambda$ denotes wavelength. The inter-element spacing may correspond to half the wavelength for a frequency in the high frequency range. Techniques are proposed for dynamically mapping SSB resources as a function of frequency and for reporting the mapping. Using the dynamic mapping of SSB resources, the wireless communications system 100 may account for performance variation associated with different operating frequencies at higher frequency bands, such as FR4.

A UE 115 may receive from a base station 105 a mapping associated with a set of SSB resources and a set of frequency bands (also referred to as frequency spectrum bands). The mapping may include an association between operating frequencies of the frequency band and parameters (e.g., SSB indices) of SSBs conveyed using the operating frequencies included in the mapping. In some aspects, the mapping may indicate a reference frequency (e.g., 71 GHz) associated with the mapping and an array gain performance (in dB) at the reference frequency with respect to beam directions (e.g., transmit beam directions, receive beam directions) associated with a channel for communicating information. The mapping may indicate array gain performance (in dB) at different operating frequencies (e.g., operating frequencies within a range of the reference frequency such as over the 57-71 GHz range) with respect to the beam directions. In some aspects, the UE 115 may receive the indication in a SIB, a MIB, RRC signaling, or DCI.

In an aspect, the UE 115 may refer to the mapping and identify SSB indices of SSBs which may be conveyed to the UE 115 at the reference frequency (e.g., 71 GHz) or some other operating frequency (e.g., 57 GHz, 61 GHz, 64 GHz, 68 GHz, etc.) included in the mapping. In some aspects, the UE 115 may identify array gain performance (in dB) and beam directions for conveying the SSBs to the UE 115 at the reference frequency or the operating frequency. The UE 115 may identify and select SSB indices corresponding to combinations of beam direction, operating frequency, and associated array gain performance (in dB). In an aspect, for achieving a given gain performance (in dB) at an operating frequency (e.g., 57 GHz, 61 GHz, 64 GHz, 68 GHz, etc.), the UE 115 may determine or select a beam direction, and accordingly, select a corresponding SSB index for receiving an SSB. The UE 115 may monitor for the SSB based on the SSB index. Accordingly, in some examples, the UE 115 may communicate information at the operating frequency and in the beam direction over reference signal resources associated with the SSB.

Figure 2:
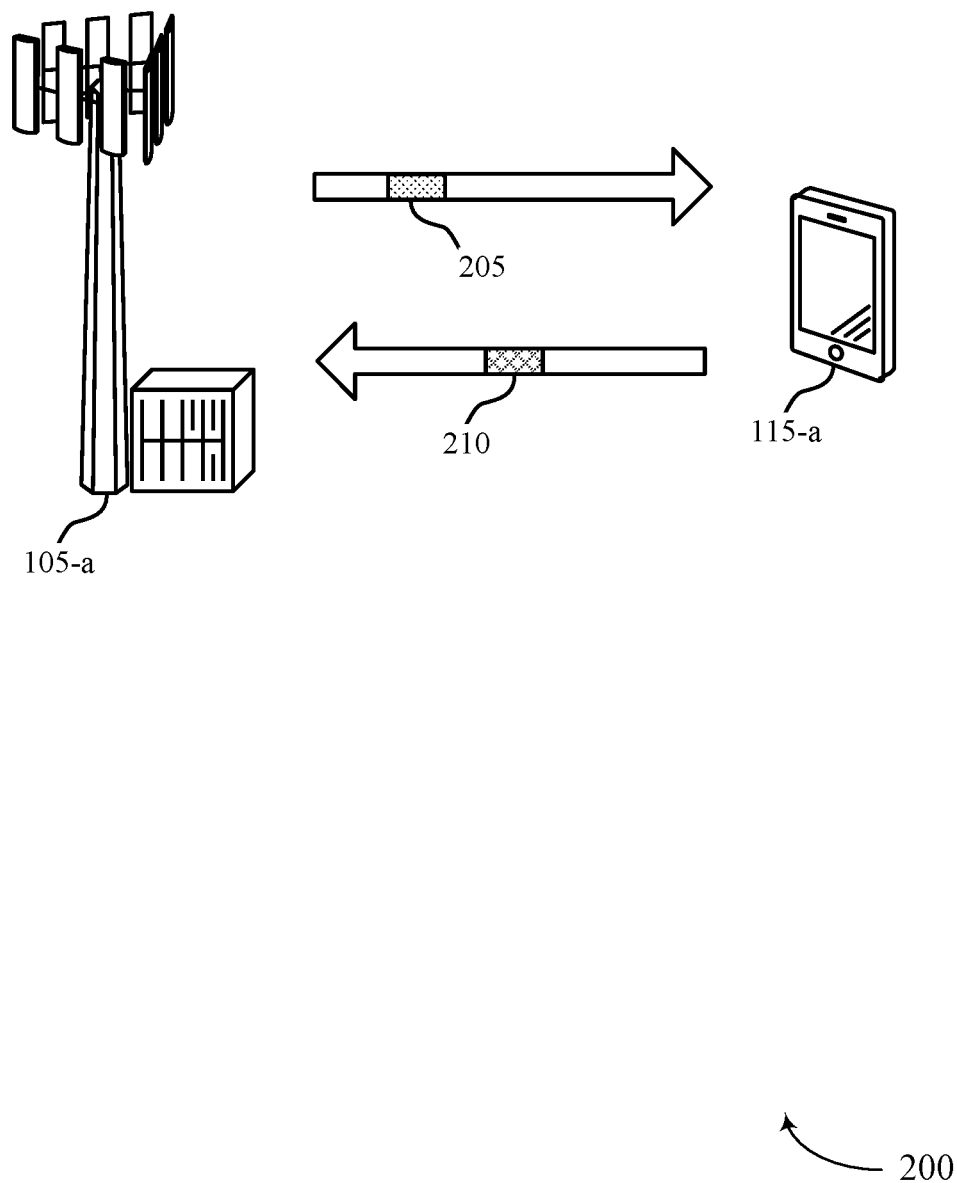
FIG. 2 illustrates an example of a wireless communications system that supports SSB mapping across different frequencies in accordance with aspects of the present disclosure.

FIG. 2 illustrates an example of a wireless communications system 200 that supports SSB mapping across different frequencies in accordance with aspects of the present disclosure. In some examples, wireless communications system 200 may implement aspects of wireless communication system 100 and may include a UE 115-a and a base station 105-a, which may be examples of a UE 115 and a base station 105, respectively, described with reference to FIG. 1. In some cases, base station 105-a may transmit one or more SSBs to UE 115-a, and UE 115-a may process (e.g., decode) the SSBs in order to receive system information and begin communications with base station 105-a.

The wireless communications system 200 may support beamformed communications between the base station 105-a and the UE 115-a. In some aspects, the wireless communications system 200 may support beamformed communications in the upper millimeter wave bands (e.g., FR4 between about 52.6 GHz and 114.25 GHz). However, the base station 105-a and the UE 115-a may experience high variations in performance of the SSBs between operating frequencies included in the FR4 frequency band. In some cases, in the FR4 frequency band, array gain performance associated with a beamforming codebook used by the base station 105-a and the UE 115-a for codebook-based beam steering may vary widely between a first operating frequency (e.g., 71 GHz) and a second operating frequency (e.g., 57 GHz). In some cases, some beams (e.g., beam directions) and corresponding sets of SSB resources in the beamforming codebook that are used for beamformed transmissions between the base station 105-a and the UE 115-a at the first operating frequency may be less useful for beamformed transmissions between the base station 105-a and the UE 115-a at the second operating frequency. For example, array gain performance associated with the beams and SSB resources for cases in which the beams and SSB resources are used at the second operating frequency may be insufficient (e.g., due to reductions in gain by about 2 to 3 dB) compared to cases in which the beams and SSB resources are used at the first operating frequency.

The wireless communications system 200 may support dynamically selecting parameters for SSBs based on a mapping of SSB resources as a function of operating frequency and/or beam direction. In some aspects, using the mapping of SSB resources, the wireless communications system 200 may account for variation in performance (e.g., array gain performance) associated with different operating frequencies (e.g., carrier frequencies) in a frequency band (e.g., the FR4 frequency band). In some examples, the base station 105-a may transmit, and the UE 115-a may receive, a mapping 205 between a set of SSB resources and a set of operating frequencies within the frequency band. The mapping 205 may include an association between operating frequencies of the frequency band and parameters (e.g., SSB indices) of SSBs conveyed using the operating frequencies included in the mapping. In some aspects, the mapping 205 may include an association between operating frequencies of the frequency band and reference signal resources associated with the SSBs (e.g., reference signal resource restrictions mapped to operating frequencies).

In some aspects, the mapping 205 may indicate how reference signals at different operating frequencies (e.g., carrier frequencies) correlate in terms of signal strength or array gain (in dB). For example, the mapping 205 may indicate a reference frequency (e.g., 71 GHz) associated with the mapping and an array gain performance (in dB) at the reference frequency with respect to beam directions (e.g., transmit beam directions, receive beam directions) associated with a channel for communicating information between the base station 105-a and the UE 115-a. The mapping 205 may indicate array gain performance (in dB) at different operating frequencies (e.g., operating frequencies within a range of the reference frequency) with respect to the beam directions.

The UE 115-a may receive the mapping 205 from the base station 105-a, for example, in a SIB, a MIB, RRC signaling, or DCI. In some aspects, the base station 105-a may configure the mapping 205 based on a communication from the UE 115-a. The communication may include, for example, a request from the UE 115-a, an operating frequency reporting message by the UE 115-a, or an operating frequency recommendation by the UE 115-a. In some other aspects, the UE 115-a may report the mapping 205 to the base station 105-a, for example, in a message. In an example, the UE 115-a may report the mapping 205 in combination with an indication of an operating frequency (included in a set of operating frequencies in the mapping 205) that the UE 115-a may use to report beam measurements.

In some aspects, the UE 115-a may refer to the mapping 205 and identify SSB indices of SSBs which may be conveyed to the UE 115-a at the reference frequency (e.g., 71 GHz) or some other operating frequency (e.g., 57 GHz, 61 GHz, 64 GHz, 68 GHz, etc.) indicated in the mapping 205. In some aspects, the UE 115-a may identify array gain performance (in dB) and beam directions for conveying the SSBs to the UE 115-a at the reference frequency or the operating frequency. The UE 115-a may identify and select SSB indices based on beam direction, operating frequency, associated array gain performance (in dB), or any combination thereof. In an aspect, for achieving a gain performance (in dB) at an operating frequency (e.g., 61 GHz), the UE 115-a may determine or select a beam direction, and accordingly, select a corresponding SSB index for receiving an SSB. The UE 115-a may monitor for the SSB based on the SSB index. Accordingly, in some examples, the UE 115-a may communicate information 210 at the operating frequency and in the beam direction (e.g., via antenna elements of an antenna array of the UE 115-a), over reference signal resources associated with the SSB.

Figure 3:
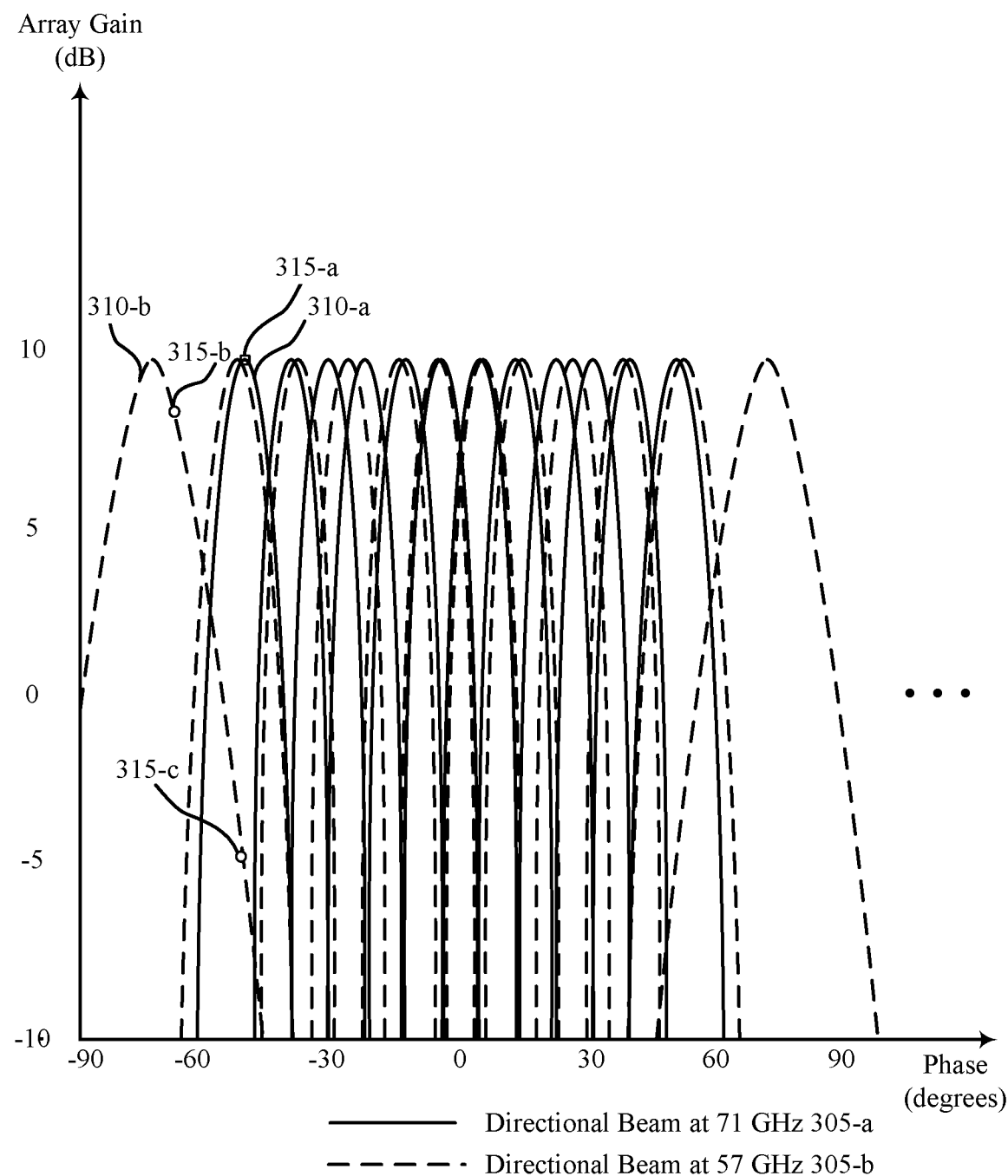
FIG. 3 illustrates an example of antenna gains that supports SSB mapping across different frequencies in accordance with aspects of the present disclosure.

FIG. 3 illustrates an example of antenna gains 300 that supports techniques for SSB mapping across different frequencies in accordance with aspects of the present disclosure. In some examples, the antenna gains 300 may implement aspects of the wireless communications systems 100 and 200 as described with reference to FIGS. 1 and 2. The antenna gains 300 may represent different antenna subarray gains with respect to phase (e.g., beam direction) for different directional beams 305 communicated between a UE 115 (e.g., the UE 115-a described with reference to FIG. 2) and a base station. Different lines show different responses of directional beams 305 at different operating frequencies (e.g., 71 GHz and 57 GHz). In some examples, the directional beams 305 may transmit directional beams. In various examples, the directional beams 305 may receive directional beams.

The directional beams 305 may represent a same directional beam of the UE 115 transmitted at different operating frequencies (e.g., carrier frequencies) in the upper millimeter wave bands (e.g., FR4 between about 52.6 GHz-114.25 GHz). In some aspects, the antenna gains 300 may implement aspects associated with a single RF chain used over an ultra-wide bandwidth range (e.g., 14 GHz wide, for example, from 57 GHz to 71 GHz) at the upper millimeter wave bands. In some cases, because a single RF chain uses a single set of phase shifters and amplitude controls, analog/RF beamforming in the upper millimeter wave bands may be constrained and may result in poor performance at operating frequencies included in the upper millimeter wave bands.

Implementing multiple RF chains to accommodate multiple operating frequencies in the upper millimeter wave bands would result in increased complexity and cost. Therefore, techniques for improving performance in the upper millimeter wave bands for a single RF chain are desired.

The antenna gains 300 are described with reference to an example antenna array of a UE 115 (e.g., UE 115-a described with reference to FIG. 2). In some aspects, the antenna array may be a 16×1 antenna array with d=λ/2 at 71 GHz, where d is an interelement spacing associated with the antenna array, and λ is wavelength. In the example described with reference to FIG. 3, the UE 115-a may use the antenna array for communications at operating frequencies included in an ultra-wide bandwidth range (e.g., 14 GHz wide) ranging from 57 GHz to 71 GHz. In some aspects, using the antenna array and a codebook (e.g., a size 12 codebook, associated with 12 SSBs), the UE 115-a may steer a directional beam over a set of directions (e.g., between zero and fifty degrees from a boresight (e.g., a main direction) of an antenna subarray, or some other angle from the boresight or the main direction). In an example, the codebook may be designed for a reference frequency (e.g., 57 GHz, or 71 GHz) of the ultra-wide bandwidth range. The antenna gains 300 illustrated in FIG. 3 are described herein with reference to a reference frequency of 71 GHz (e.g., codebook at 71 GHz).

In some examples, a directional beam 305-a may correspond to a beamformed transmission at a first operating frequency (e.g., 71 GHz) based on a codebook designed for the first operating frequency (e.g., 71 GHz). A directional beam 305-b may correspond to a beamformed transmission at a second operating frequency (e.g., 57 GHz) based on the codebook designed for the first operating frequency (e.g., 71 GHz). Referring to the antenna gains 300, array gain performance may vary based on an operating frequency of a directional beam 305. The antenna gains 300 is a non-limiting example of an antenna subarray gain, and other antenna subarray gains at other operating frequencies are possible.

For a directional beam 305 pointing in a given direction, characteristics (e.g., gain, direction) of the directional beam 305 with respect to a main lobe and one or more respective side lobes (for clarity side lobes are not illustrated) may vary in both direction and gain based on operating frequency. For example, for the directional beam 305-a at the first operating frequency (e.g., 71 GHz), a response 310-a corresponding to a certain SSB (e.g., $SSB_0$) may have a peak (illustrated by marker 315-a) (e.g., a 10 dB gain) for a beam direction (e.g., phase angle) of −45 degrees. In an aspect, the UE 115-a may select the SSB index of zero (e.g., $SSB_0$) to transmit in the beam direction of −45 degrees at the 10 dB gain and the first operating frequency. In some cases, in which the UE 115-a uses the same SSB index (e.g., $SSB_0$) to transmit at the second operating frequency (e.g., 57 GHz) (e.g., as part of a channel hopping procedure), the UE 115-a may experience a different gain (e.g., 2 to 3 dB drop).

For example, if the UE 115-a uses the same SSB index (e.g., $SSB_0$) to transmit at the first operating frequency (e.g., 71 GHz) and the second operating frequency (e.g., 57 GHz), the directional beam 305-b may have different gains. For instance, the SSB at 57 GHz may have a 3 dB drop compared to the transmitting at the first operating frequency and/or may be pointed in a beam direction (e.g., phase angle) of −70 degrees, as illustrated by the response 310-b and marker 315-b. In some cases, referring to the response 310-b, the directional beam 305-b may have a −5 dB gain (e.g., a 15 dB drop compared to the transmitting at the first operating frequency) for the beam direction (e.g., phase angle) of −45 degrees. The response 310-a and the response 310-b may be at an edge of coverage associated with the antenna array and a codebook (e.g., a size 12 codebook, associated with 12 SSBs).

Aspects of the antenna gains 300 described herein are also applicable to other reference frequencies (e.g., 57 GHz). For example, for a reference frequency of 57 GHz (e.g., codebook at 57 GHz), the directional beam 305-a at the first operating frequency (e.g., 57 GHz) and the directional beam 305-b at the second operating frequency (e.g., 71 GHz) may have a different response (e.g., array gain compared to phase) than that illustrated in FIG. 3. However, the example aspects illustrated in FIG. 3 may be applicable to the reference frequency of 57 GHz. That is, performance (e.g., gain, beam direction) associated with an SSB index (e.g., $SSB_0$) may vary across operating frequencies (e.g., 71 GHz compared to 61 GHz, 57 GHz compared to 71 GHz).

Accordingly, due to a wideband effect (e.g., expansion in the frequency domain) in an ultra-wide bandwidth range (e.g., 14 GHz) in the upper millimeter wave bands (e.g., FR4 between about 52.6 GHz and 114.25 GHz), the UE 115-a may be unable to use the same SSB parameter (e.g., SSB index) to transmit in the same beam direction across different frequencies in such an ultra-wide bandwidth range in the upper millimeter wave bands. That is, in some cases, an $SSB_0$ at 57 GHz may map to an $SSB_1$ at 71 GHz. The same directional beam 305 at 57 GHz may point in a different direction (degrees) at 71 GHz. In some cases, the impact of the wideband effect (e.g., shift in directions, difference in array gain, change in SSB mapping) described with reference to the upper millimeter wave bands (e.g., FR4) may be negligible or marginal in other frequency bands such as frequency range 1 (FR1 between about 410 MHz to 7.125 GHz), frequency range 2 (FR2 between about 24.25 GHz to 52.6 GHz), and frequency range 3 (FR3 between about 7.125 GHz to 24.25 GHz).

Referring to the antenna gains 300, the directional beams 305 may have a low correlation with respect to operating frequency (e.g., independent of design). In some aspects, switching between different beam indexes may be beneficial when switching between different operating frequencies in the upper millimeter wave bands (e.g., especially towards an edge of coverage). In such cases, selecting an SSB parameter based on both the operating frequency and the direction may be beneficial. For example, depending on a beam direction (beam angle) of interest, using different beams from either 57 GHz or 71 GHz could achieve improvements in reducing loss in array gain. In some aspects, the UE 115-a (and the base station 105-a) may utilize a smaller codebook size at an operating frequency of 71 GHz to cover the same area as that covered with an operating frequency of 57 GHz.

In an example, with reference to FIG. 2, the mapping 205 may include an association between operating frequencies in an ultra-wide bandwidth range (e.g., 14 GHz) in the upper millimeter wave bands (e.g., FR4 between about 52.6 GHz and 114.25 GHz) described herein and parameters (e.g., SSB indices) of SSBs conveyed using the operating frequencies included in the mapping 205. In some aspects, the mapping 205 may indicate how reference signals at different operating frequencies (e.g., 57 GHz and 61 GHz, 57 GHz and 71 GHz) correlate in terms of signal strength or array gain (in dB). For example, the mapping 205 may indicate a reference frequency (e.g., 57 GHz) associated with the mapping 205 and the antenna gains 300 at the reference frequency with respect to directional beams 305. The mapping 205 may indicate the antenna gains 300 at different operating frequencies (e.g., operating frequencies within the ultra-wide bandwidth range of 14 GHz) with respect to the beam directions.

The UE 115-a may refer to the mapping 205 and identify SSB indices of SSBs which may be conveyed to the UE 115-a at the reference frequency (e.g., 71 GHz) or some other operating frequency (e.g., 57 GHz, 61 GHz, any operating frequency within the ultra-wide bandwidth range of 14 GHz) indicated in the mapping 205. In some aspects, the UE 115-a may identify array gain performance (in dB) and beam directions for conveying the SSBs to the UE 115-a at the reference frequency or the operating frequency. The UE 115-a may identify and select SSB indices corresponding to combinations of beam direction, operating frequency, and associated array gain performance (in dB). In an aspect, for achieving a gain performance (in dB) (e.g., a gain performance selected by the UE 115-a) at an operating frequency (e.g., 61 GHz), the UE 115-a may determine or select a beam direction, and accordingly, select a corresponding SSB index for receiving an SSB. The UE 115-a may monitor for the SSB based on the SSB index. Accordingly, in some examples, the UE 115-a may communicate information 210 at the operating frequency and in the beam direction (e.g., via antenna elements of an antenna array of the UE 115-a), over reference signal resources associated with the SSB.

Figure 4:
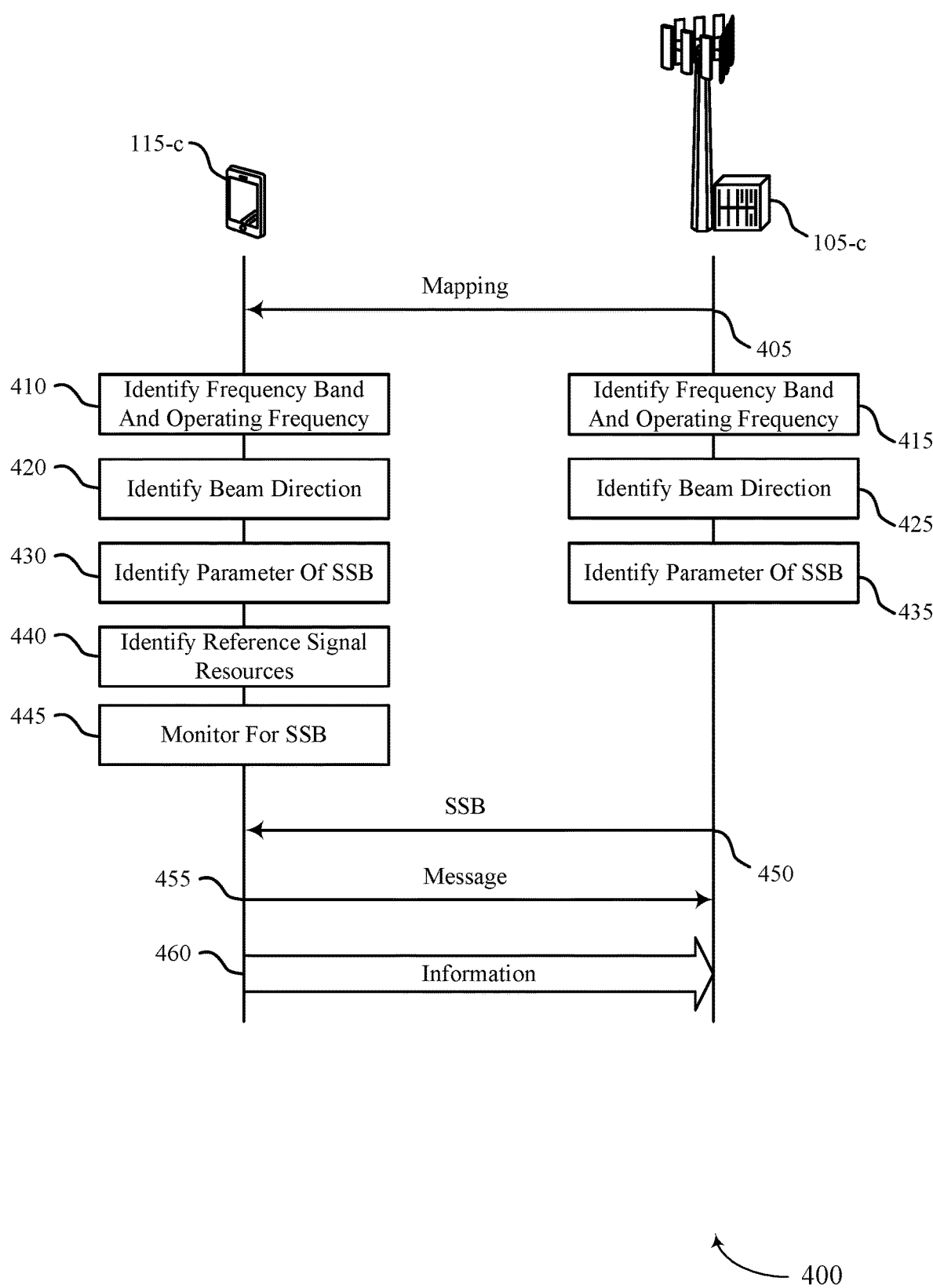
FIG. 4 illustrates an example of a process flow that supports SSB mapping across different frequencies in accordance with aspects of the present disclosure.

FIG. 4 illustrates an example of a process flow 400 that supports SSB mapping across different frequencies in accordance with aspects of the present disclosure. In some examples, process flow 400 may implement aspects of wireless communications systems 100 or 200. Additionally, process flow 400 may be implemented by a UE 115-c and a base station 105-c, which may be examples of a UE 115, a UE 115-a, a base station 105, and a base station 105-a described with reference to FIGS. 1 and 2.

In the following description of the process flow 400, the operations between UE 115-c and base station 105-c may be transmitted in a different order than the order shown, or the operations performed by base station 105-c and UE 115-c may be performed in different orders or at different times. Certain operations may also be left out of the process flow 400, or other operations may be added to the process flow 400. It is to be understood that while base station 105-c and UE 115-c are shown performing a quantity of the operations of process flow 400, any wireless device may perform the operations shown.

At 405, the UE 115-c may receive a mapping between a set of SSB resources and a set of operating frequencies within a frequency band (e.g., FR4, or an ultra-wide bandwidth range (e.g., 14 GHz) in FR4). In some aspects, the UE 115-c may receive the mapping from the base station 105-c. The mapping may include an association between the set of operating frequencies within the frequency band and/or the direction of a beam and parameters of SSBs conveyed using the set of operating frequencies included in the mapping. In some aspects, the parameters may include SSB indices associated with the set of operating frequencies within the frequency band.

In an example, the mapping may include a mapping of SSB parameters across different operating frequencies within a frequency band (e.g., FR4, or an ultra-wide bandwidth range (e.g., 14 GHz) in FR4). For example, the mapping may indicate that an $SSB_0$ at a first operating frequency (e.g., 71 GHz) maps to a first gain and/or a first direction while $SSB_0$ at a second operating frequency (e.g., 57 GHz) maps to a second gain and/or a second direction. In another example, the mapping may indicate that an $SSB_{11}$ at the first operating frequency (e.g., 71 GHz) maps to an $SSB_{10}$ at the second operating frequency (e.g., 57 GHz).

At 410, the UE 115-c may identify the frequency band and an operating frequency of the set of operating frequencies used to convey the SSB. At 415, the base station 105-c may identify the frequency band and the operating frequency of the set of operating frequencies used to convey the SSB.

At 420, the UE 115-c may identify the direction associated with the beam based on the receiving of the mapping. In some examples, the UE 115-c may identify, based on the received mapping, a first gain associated with a first operating frequency of the set of operating frequencies and the direction of the beam and a second gain associated with a second operating frequency of the set of operating frequencies and a second direction of a second beam. For example, the mapping may indicate how a reference signal at one operating frequency (carrier frequency) maps to signal strength and array gain at a different carrier frequency. At 425, the base station 105-c may identify the direction associated with the beam based on the mapping.

At 430, the UE 115-c may identify a parameter of an SSB based on an operating frequency of the set of operating frequencies for conveying the SSB and a direction of a beam for conveying the SSB. In some aspects, the UE 115-c may identify an index of the SSB within an SSB set based on the frequency band and the direction. In some examples, at 430, the UE 115-c may identify the parameter based on identifying the first gain and the second gain.

In some aspects, at 430, the UE 115-c may identify, based on the mapping received at 405, an offset between the parameter (e.g., index) of the SSB conveyed using a first operating frequency (e.g., 71 GHz) of the frequency band relative to a second parameter (e.g., index) of a second SSB conveyed using a second operating frequency (e.g., 57 GHz) of the frequency band. For example, the mapping at 405 may include a first table indicating an array gain and beam direction corresponding to a set of SSB indices with respect to the first operating frequency. In some aspects, the mapping at 405 may include a second table indicating an array gain and beam direction corresponding to a set of SSB indices with respect to the second operating frequency. In some other aspects, the mapping at 405 may include the first table with respect to the first operating frequency in combination with a set of offsets. Using the offsets, the UE 115-c may map the SSB indices for the first operating frequency to SSB indices for the second operating frequency based on the offsets, which may reduce memory usage compared to storing multiple tables.

In some examples, the mapping may indicate a used set of SSB indices across different frequencies (e.g., across frequencies included in FR4, or across frequencies included in an ultra-wide bandwidth range (e.g., 14 GHz, ranging from 57 GHz to 71 GHz) in FR4). In some aspects, the mapping may indicate a first operating frequency (e.g., $f_0$=57 GHz) as a baseline, with a second operating frequency (e.g., $f_1$=60 GHz) using SSB set indices 1 to 20, and a third operating frequency (e.g., $f_2$=71 GHz) using SSB set indices from 2 to 21

At 435, the base station 105-c may identify the parameter (e.g., index) of the SSB based on the operating frequency of the set of operating frequencies for conveying the SSB and the direction of the beam for conveying the SSB.

At 440, the UE 115-c may identify a set of reference signal resources associated with the SSB in the frequency band based on the mapping and the operating frequency. In some aspects, the UE 115-c may determine that the operating frequency of the set of operating frequencies satisfies a criterion, where the set of reference signal resources is associated with the operating frequency. In an aspect, the mapping may be a reference signal resource restriction based on operating frequency (carrier frequency) at the UE 115-c. In some aspects, the mapping may include an SSB restriction with respect to operating frequencies.

At 445, the UE 115-c may monitor for the SSB based on the identified parameter (e.g., the identified index). In some aspects, at 445, the UE 115-c may monitor for the SSB based on the offset identified at 430.

At 450, the UE 115-c may receive the SSB based on the identified parameter (e.g., the identified index).

At 455, the UE 115-c may transmit, to the base station 105-c, a message indicating the mapping, where the mapping further includes an association between the set of operating frequencies within the frequency band and parameters of SSBs conveyed using the set of operating frequencies included in the mapping. In some aspects, the UE 115-c may transmit an indication of an operating frequency of the set of operating frequencies that is used to report beam measurements, where the indication is included in the message. In some examples, the UE 115-c may indicate the reference frequency with which beam measurements are reported and a set of SSBs from a global set of SSBs useable for the operating frequency (carrier frequency).

At 460, the UE 115-c may communicate information (e.g., data) using the set of reference signal resources.

Figure 5:
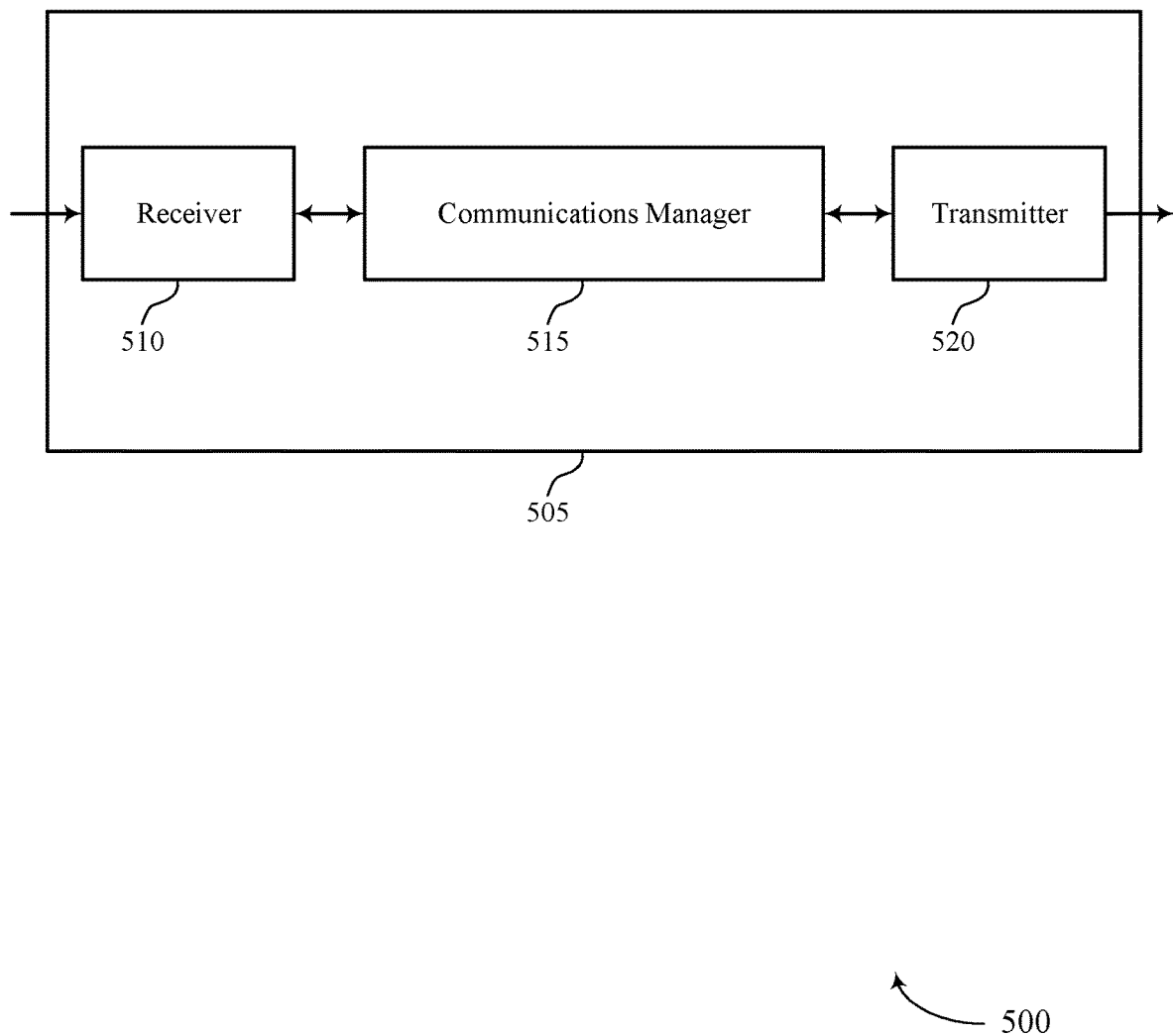
FIGS. 5 and 6 show block diagrams of devices that support SSB mapping across different frequencies in accordance with aspects of the present disclosure.

FIG. 5 shows a block diagram 500 of a device 505 that supports SSB mapping across different frequencies in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to SSB mapping across different frequencies, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a mapping between a set of SSB resources and a set of operating frequencies within a frequency band, identify a parameter of a SSB based on an operating frequency of the set of operating frequencies for conveying the SSB and a direction of a beam for conveying the SSB, and monitor for the SSB based on the identified parameter. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 515 as described herein may be implemented to realize one or more potential advantages. One implementation may allow a UE 115 to improve quality and reliability of service at the UE 115, as performance in the upper millimeter wave bands for a single RF chain are improved.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
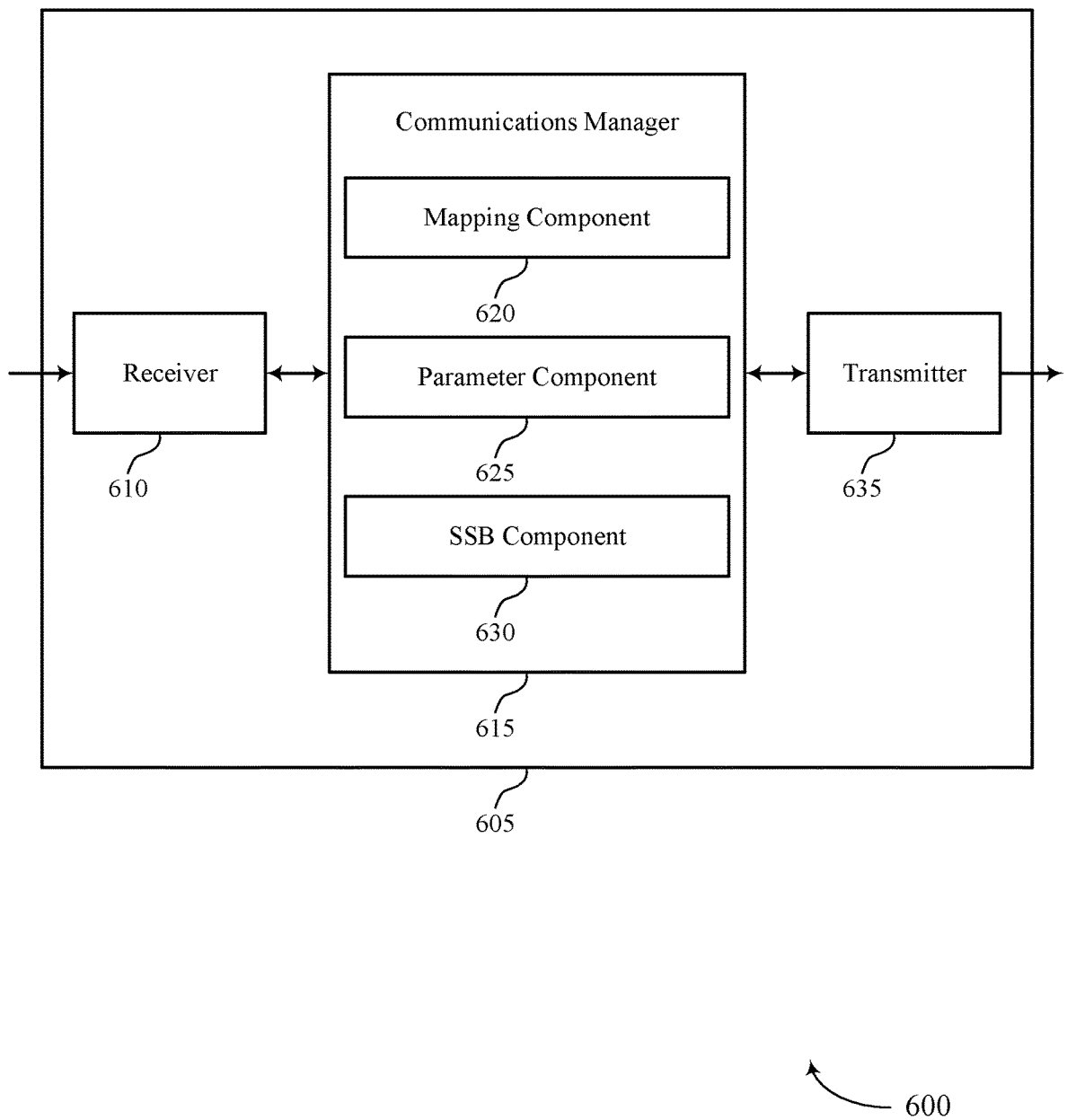

FIG. 6 shows a block diagram 600 of a device 605 that supports SSB mapping across different frequencies in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to SSB mapping across different frequencies, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a mapping component 620, a parameter component 625, and a SSB component 630. The communications manager 615 may be an example of aspects of the communications manager 810 described herein.

The mapping component 620 may receive a mapping between a set of SSB resources and a set of operating frequencies within a frequency band. The parameter component 625 may identify a parameter of an SSB based on an operating frequency of the set of operating frequencies for conveying the SSB and a direction of a beam for conveying the SSB. The SSB component 630 may monitor for the SSB based on the identified parameter.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
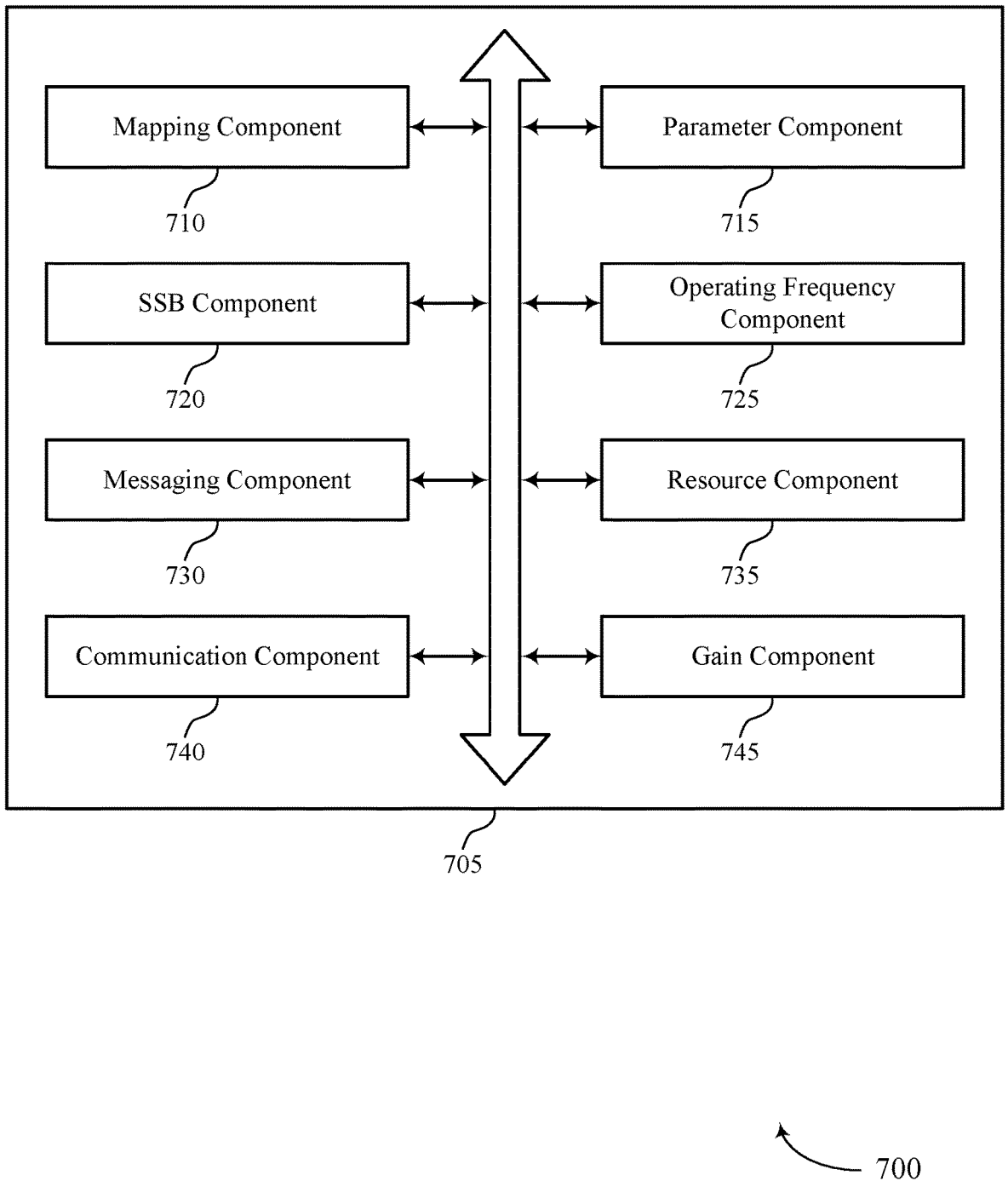
FIG. 7 shows a block diagram of a communications manager that supports SSB mapping across different frequencies in accordance with aspects of the present disclosure.

FIG. 7 shows a block diagram 700 of a communications manager 705 that supports SSB mapping across different frequencies in accordance with aspects of the present disclosure. The communications manager 705 may be an example of aspects of a communications manager 515, a communications manager 615, or a communications manager 810 described herein. The communications manager 705 may include a mapping component 710, a parameter component 715, a SSB component 720, an operating frequency component 725, a messaging component 730, a resource component 735, a communication component 740, and a gain component 745. Each of these modules may communicate, directly or indirectly, with one another (e.g., via one or more buses).

The mapping component 710 may receive a mapping between a set of SSB resources and a set of operating frequencies within a frequency band.

In some examples, the mapping component 710 may identify the frequency band and the direction of the beam based on receiving of the mapping.

In some examples, the mapping component 710 may receive the mapping from a base station, the mapping further including an association between the set of operating frequencies within the frequency band and parameters of SSBs conveyed using the set of operating frequencies included in the mapping. In some examples, the mapping further includes an association between the set of operating frequencies within the frequency band and parameters of SSBs conveyed using the set of operating frequencies included in the mapping.

In some examples, the mapping component 710 may transmit a request for the mapping. In some examples, the mapping component 710 may receive the mapping based on transmitting the request. In some examples, the mapping component 710 may identify, based on receiving the mapping, an offset between the parameter of the SSB conveyed using a first operating frequency of the frequency band relative to a second parameter of a second SSB conveyed using a second operating frequency of the frequency band. In some cases, the mapping is included in a SIB, a MIB, RRC signaling, DCI, or a combination thereof. In some cases, the mapping includes an indication of one or more groups of SSBs and one or more sets of SSBs of the one or more groups of the SSBs.

The parameter component 715 may identify a parameter of an SSB based on an operating frequency of the set of operating frequencies for conveying the SSB and a direction of a beam for conveying the SSB. In some examples, the parameter component 715 may identify the parameter based on identifying the operating frequency of the set of operating frequencies.

In some examples, the parameter component 715 may identify the parameter based on identifying the frequency band and the direction. In some examples, the parameter component 715 may identify the parameter based on identifying the first gain and the second gain. In some cases, the parameters include SSB indices associated with the set of operating frequencies within the frequency band. The SSB component 720 may monitor for the SSB based on the identified parameter. In some examples, the SSB component 720 may identify an index of the SSB within an SSB set based on the frequency band and the direction. In some examples, the SSB component 720 may monitor for the SSB based on identifying the index. In some examples, the SSB component 720 may monitor for the SSB based on identifying the offset. In some cases, the SSB is conveyed over a first set of the set of SSB resources using the frequency band. The operating frequency component 725 may identify the operating frequency of the set of operating frequencies used to convey the SSB. In some examples, the operating frequency component 725 may determine that the operating frequency of the set of operating frequencies satisfies a criterion.

The messaging component 730 may transmit, to a base station, a message indicating the mapping. In some examples, the messaging component 730 may transmit an indication of an operating frequency of the set of operating frequencies that is used to report beam measurements. In some examples, the indication may be included in the message.

The resource component 735 may identify a set of reference signal resources associated with the SSB in the frequency band based on the mapping and the operating frequency. In some examples, the set of reference signal resources may be associated with the operating frequency.

The communication component 740 may communicate information using the set of reference signal resources. In some examples, the communication component 740 may communicate information using the operating frequency of the set of operating frequencies based on the monitoring for the SSB.

The gain component 745 may identify, based on the received mapping, a first gain associated with a first operating frequency of the set of operating frequencies and the direction of the beam and a second gain associated with a second operating frequency of the set of operating frequencies and a second direction of a second beam.

Figure 8:
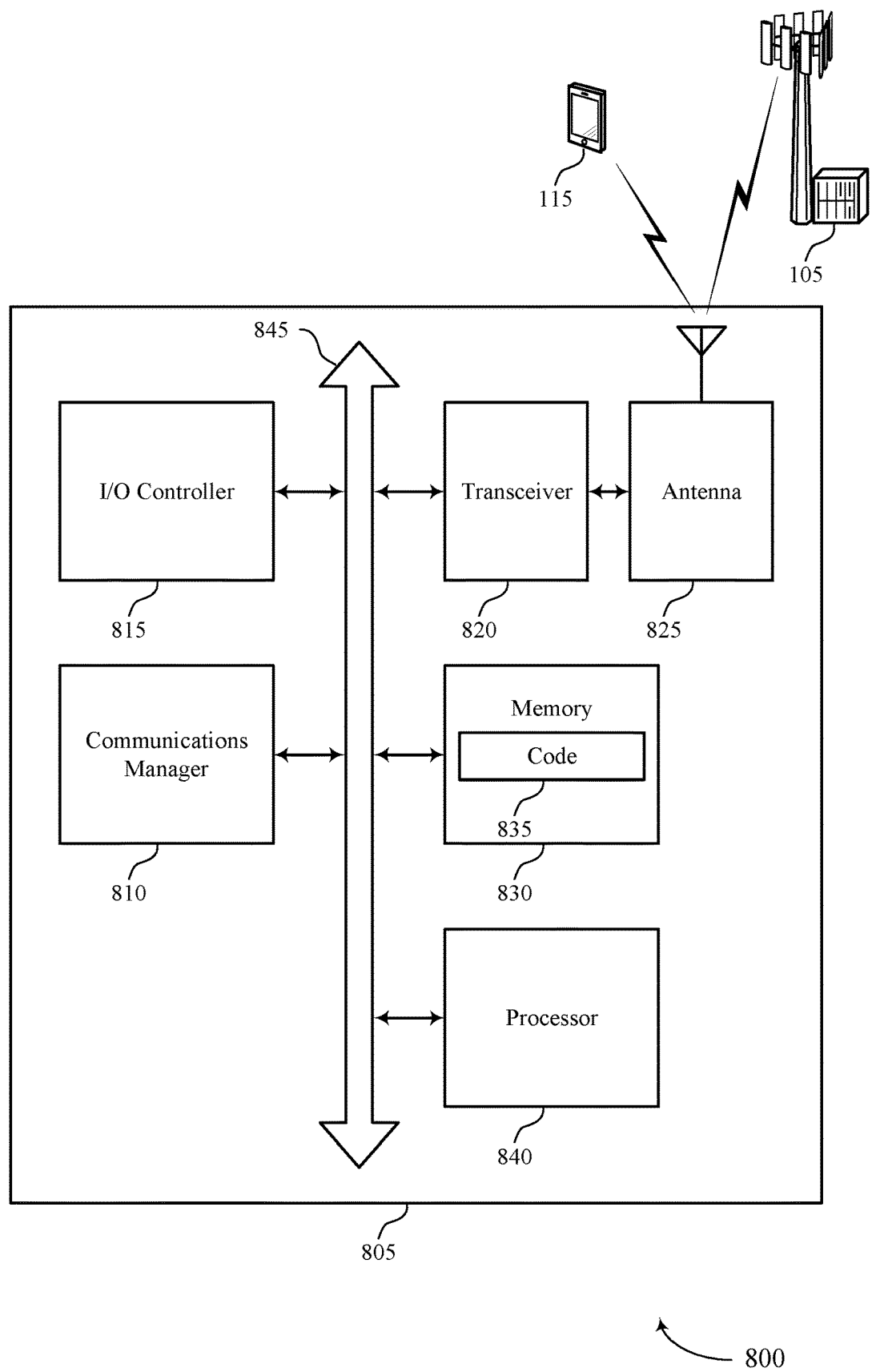
FIG. 8 shows a diagram of a system including a device that supports SSB mapping across different frequencies in accordance with aspects of the present disclosure.

FIG. 8 shows a diagram of a system 800 including a device 805 that supports SSB mapping across different frequencies in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a mapping between a set of SSB resources and a set of operating frequencies within a frequency band, identify a parameter of a SSB based on an operating frequency of the set of operating frequencies for conveying the SSB and a direction of a beam for conveying the SSB, and monitor for the SSB based on the identified parameter.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting SSB mapping across different frequencies).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
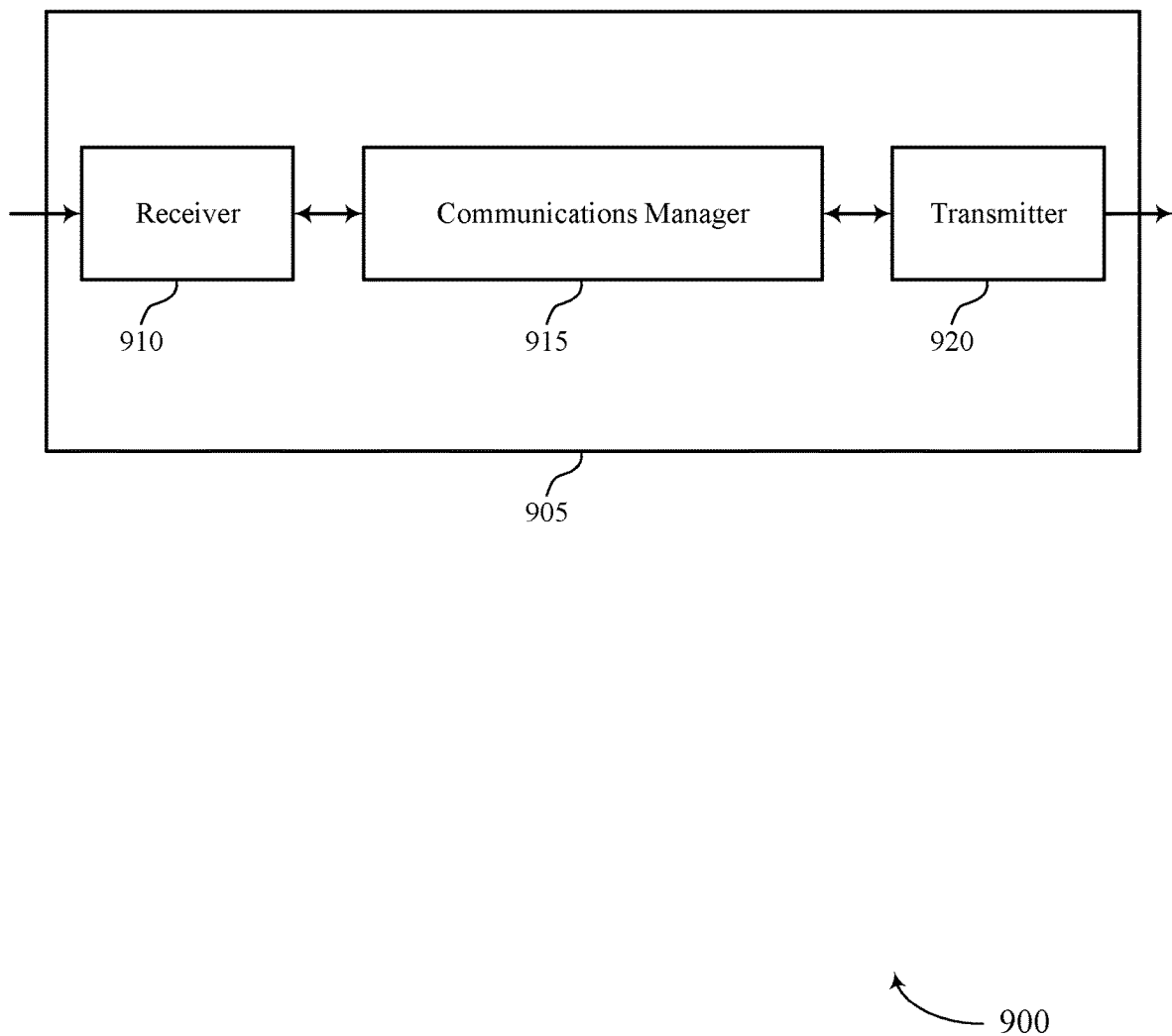
FIGS. 9 and 10 show block diagrams of devices that support SSB mapping across different frequencies in accordance with aspects of the present disclosure.

FIG. 9 shows a block diagram 900 of a device 905 that supports SSB mapping across different frequencies in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to SSB mapping across different frequencies, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a mapping between a set of SSB resources and a set of operating frequencies within a frequency band, identify a parameter of a SSB based on an operating frequency of the set of operating frequencies for conveying the SSB and a direction of a beam for conveying the SSB, and transmit the SSB based on the identified parameter. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 915 as described herein may be implemented to realize one or more potential advantages. One implementation may allow a base station 105 to improve quality and reliability of service at the base station 105, as performance in the upper millimeter wave bands for a single RF chain are improved.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
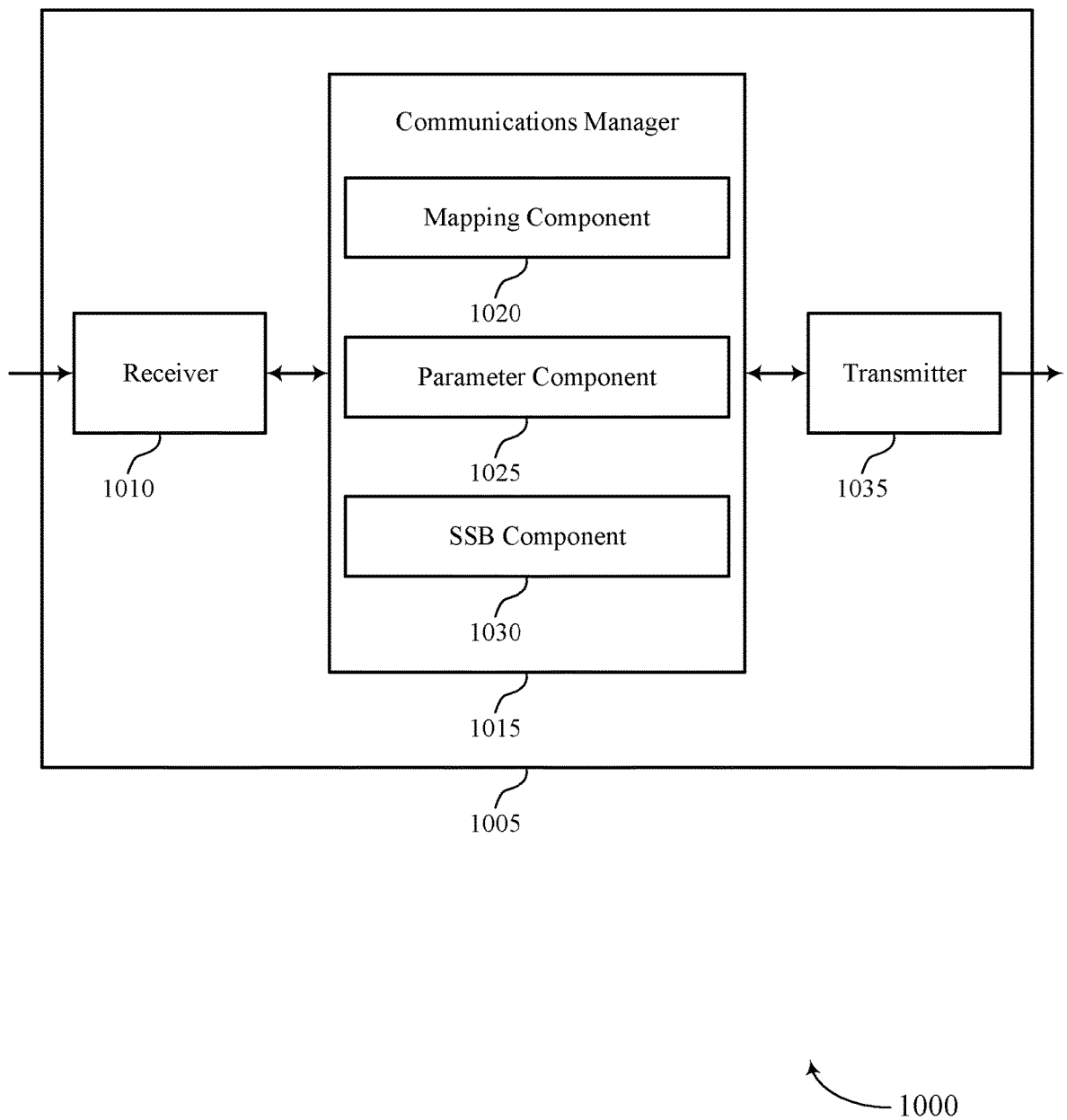

FIG. 10 shows a block diagram 1000 of a device 1005 that supports SSB mapping across different frequencies in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to SSB mapping across different frequencies, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a mapping component 1020, a parameter component 1025, and a SSB component 1030. The communications manager 1015 may be an example of aspects of the communications manager 1210 described herein.

The mapping component 1020 may transmit a mapping between a set of SSB resources and a set of operating frequencies within a frequency band. The parameter component 1025 may identify a parameter of an SSB based on an operating frequency of the set of operating frequencies for conveying the SSB and a direction of a beam for conveying the SSB. The SSB component 1030 may transmit the SSB based on the identified parameter.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
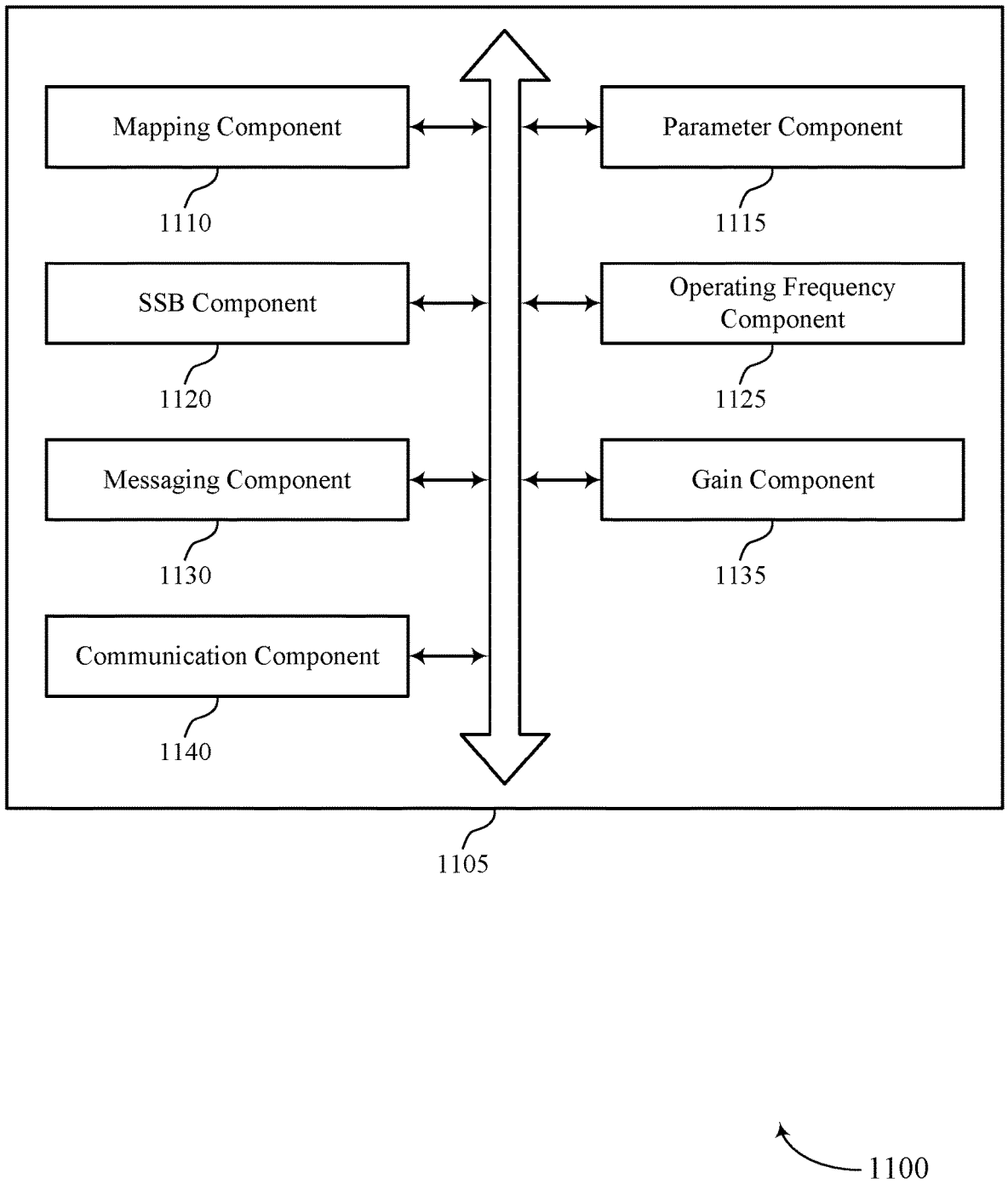
FIG. 11 shows a block diagram of a communications manager that supports SSB mapping across different frequencies in accordance with aspects of the present disclosure.

FIG. 11 shows a block diagram 1100 of a communications manager 1105 that supports SSB mapping across different frequencies in accordance with aspects of the present disclosure. The communications manager 1105 may be an example of aspects of a communications manager 915, a communications manager 1015, or a communications manager 1210 described herein. The communications manager 1105 may include a mapping component 1110, a parameter component 1115, a SSB component 1120, an operating frequency component 1125, a messaging component 1130, a gain component 1135, and a communication component 1140. Each of these modules may communicate, directly or indirectly, with one another (e.g., via one or more buses).

The mapping component 1110 may transmit a mapping between a set of SSB resources and a set of operating frequencies within a frequency band. In some examples, the mapping component 1110 may identify the frequency band and the direction associated with the beam based on the mapping. In some examples, the mapping component 1110 may transmit the mapping to a user equipment, the mapping further including an association between the set of operating frequencies within the frequency band and parameters of SSBs conveyed using the set of operating frequencies included in the mapping.

In some examples, the mapping component 1110 may receive, from a user equipment, a request for the mapping. In some examples, the mapping component 1110 transmit the mapping based on transmitting the request.

In some examples, the mapping component 1110 may transmit the mapping based on identifying the offset.

In some cases, the mapping is included in a SIB, a master information block (MIB), RRC signaling, DCI, or a combination thereof. In some cases, the mapping includes an indication of one or more groups of SSBs and one or more sets of SSBs of the one or more groups of the SSBs.

The parameter component 1115 may identify a parameter of an SSB based on an operating frequency of the set of operating frequencies for conveying the SSB and a direction of a beam for conveying the SSB. In some examples, the parameter component 1115 may identify the parameter based on identifying the operating frequency of the set of operating frequencies. In some examples, the parameter component 1115 identify the parameter based on identifying the frequency band and the direction. In some examples, the parameter component 1115 identify the parameter based on identifying the first gain and the second gain. In some examples, the parameter component 1115 may identify an offset between the parameter of the SSB conveyed using a first operating frequency of the frequency band relative to a second parameter of a second SSB conveyed using a second operating frequency of the frequency band.

In some cases, the parameters include SSB indices associated with the set of operating frequencies within the frequency band.

The SSB component 1120 may transmit the SSB based on the identified parameter.

In some examples, the SSB component 1120 may identify an index of the SSB within an SSB set based on the frequency band and the direction.

In some examples, the SSB component 1120 may transmit the SSB based on identifying the index. In some cases, the SSB is conveyed over a first set of the set of SSB resources using the frequency band.

The operating frequency component 1125 may identify the operating frequency of the set of operating frequencies used to convey the SSB. In some examples, the operating frequency component 1125 may receive an indication of an operating frequency of the set of operating frequencies that is used to report beam measurements.

The messaging component 1130 may receive, from a user equipment, a message indicating the mapping, where the mapping further includes an association between the set of operating frequencies within the frequency band and parameters of SSBs conveyed using the set of operating frequencies included in the mapping. In some examples, the indication may be included in the message.

The gain component 1135 may identify, based on the mapping, a first gain associated with a first operating frequency of the set of operating frequencies and the direction of the beam and a second gain associated with a second operating frequency of the set of operating frequencies and a second direction of a second beam.

The communication component 1140 may communicate information using the operating frequency of the set of operating frequencies based on monitoring for the SSB.

Figure 12:
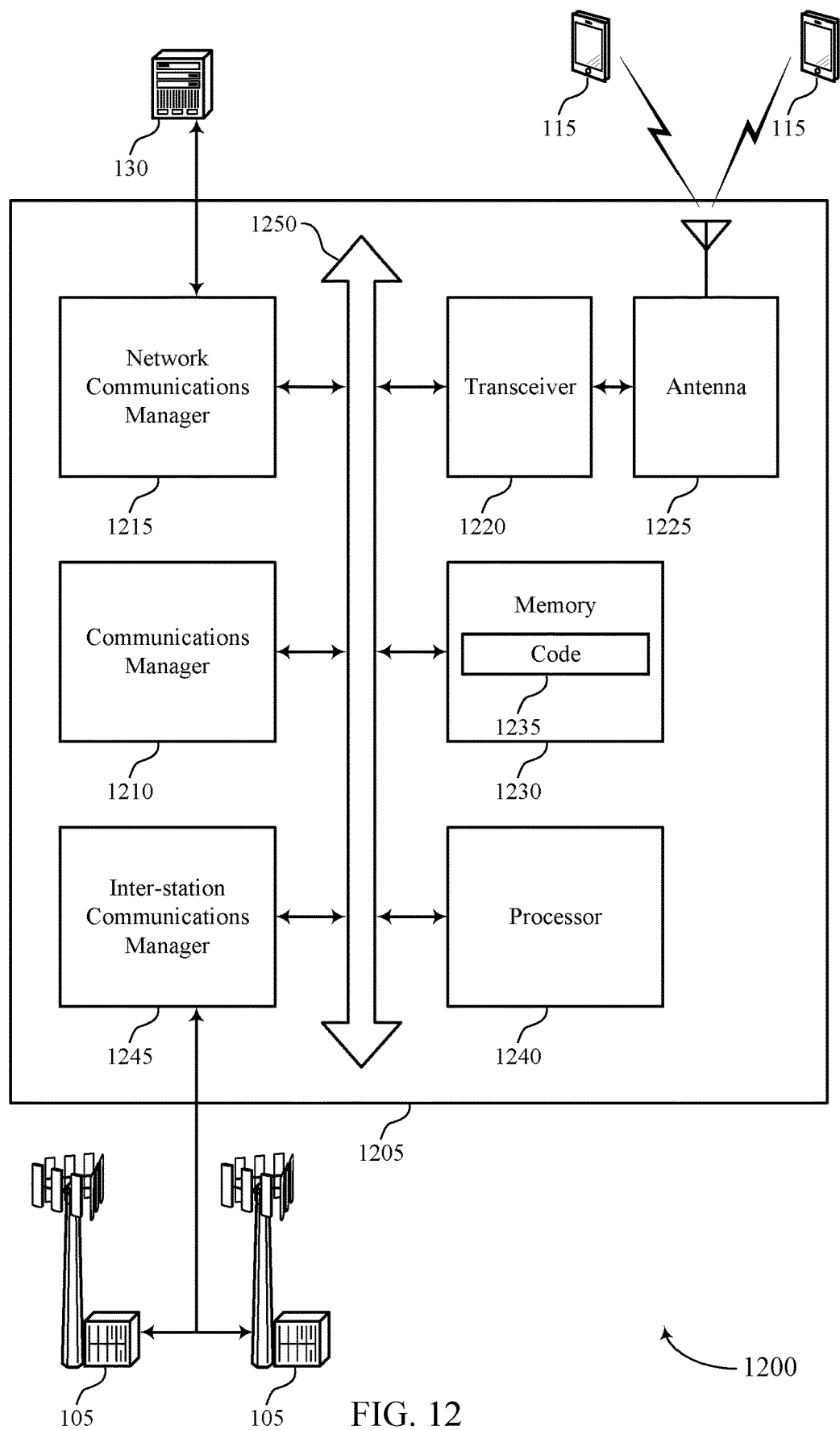
FIG. 12 shows a diagram of a system including a device that supports SSB mapping across different frequencies in accordance with aspects of the present disclosure.

FIG. 12 shows a diagram of a system 1200 including a device 1205 that supports SSB mapping across different frequencies in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a mapping between a set of SSB resources and a set of operating frequencies within a frequency band, identify a parameter of a SSB based on an operating frequency of the set of operating frequencies for conveying the SSB and a direction of a beam for conveying the SSB, and transmit the SSB based on the identified parameter.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting SSB mapping across different frequencies).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
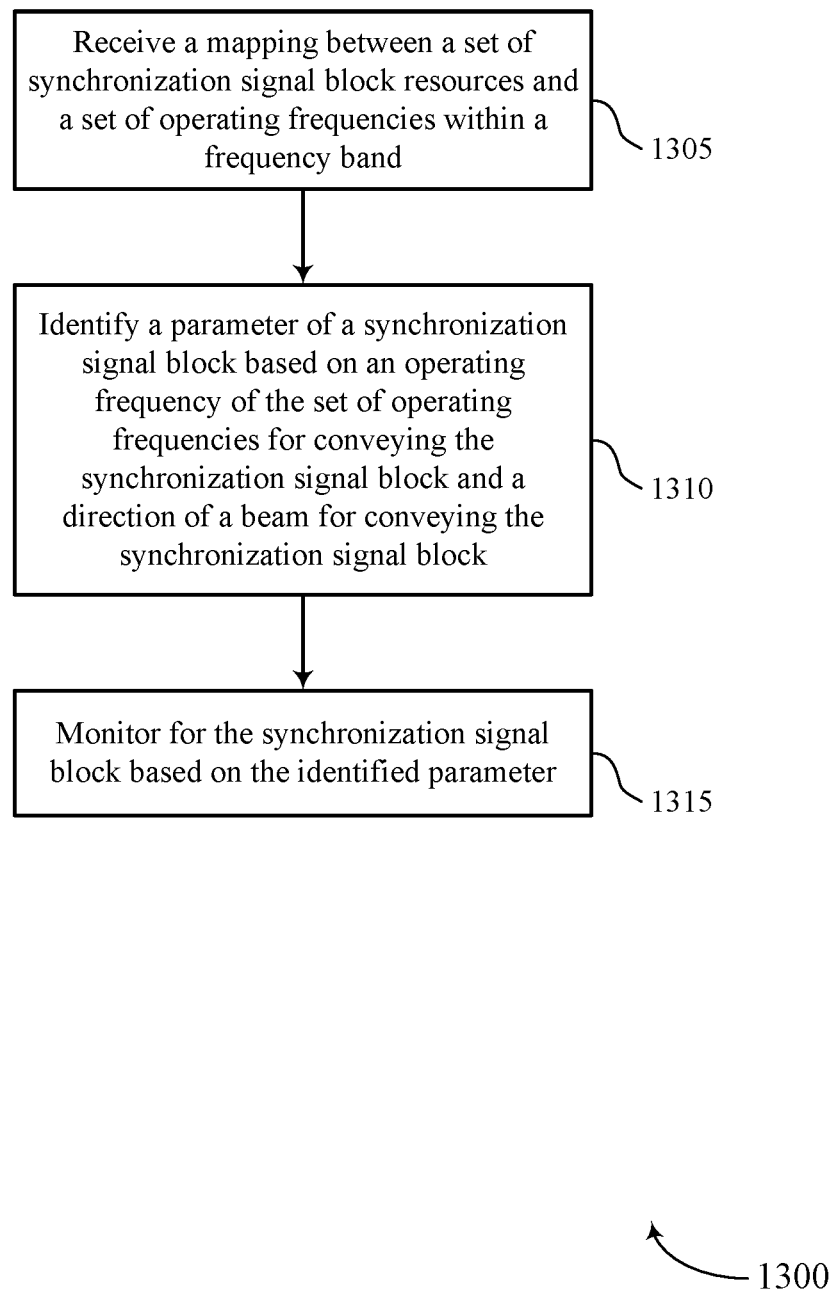
FIGS. 13 through 15 show flowcharts illustrating methods that support SSB mapping across different frequencies in accordance with aspects of the present disclosure.

FIG. 13 shows a flowchart illustrating a method 1300 that supports SSB mapping across different frequencies in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a mapping between a set of SSB resources and a set of operating frequencies within a frequency band. The operations of 1305 may be performed according to the methods described herein. In some examples, aspects of the operations of 1305 may be performed by a mapping component as described with reference to FIGS. 5 through 8.

At 1310, the UE may identify a parameter of an SSB based on an operating frequency of the set of operating frequencies for conveying the SSB and a direction of a beam for conveying the SSB. In some aspects, the UE may identify an index of the SSB within an SSB set based on the frequency band and the direction. The operations of 1310 may be performed according to the methods described herein. In some examples, aspects of the operations of 1310 may be performed by a parameter component as described with reference to FIGS. 5 through 8.

At 1315, the UE may monitor for the SSB based on the identified parameter. In some aspects, the UE may monitor for the SSB based on identifying the index. The operations of 1315 may be performed according to the methods described herein. In some examples, aspects of the operations of 1315 may be performed by an SSB component as described with reference to FIGS. 5 through 8.

Figure 14:
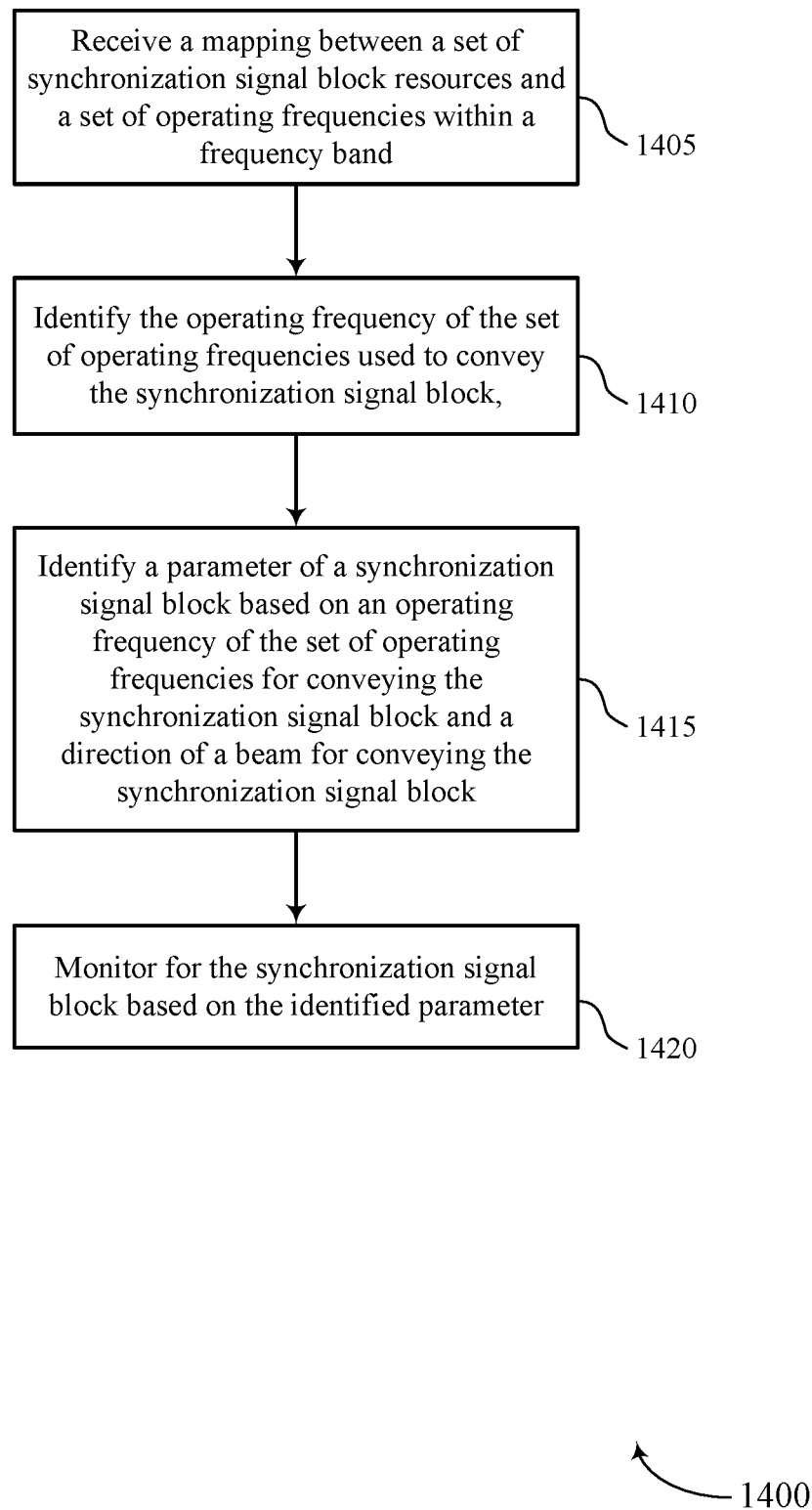

FIG. 14 shows a flowchart illustrating a method 1400 that supports SSB mapping across different frequencies in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a mapping between a set of SSB resources and a set of operating frequencies within a frequency band. The operations of 1405 may be performed according to the methods described herein. In some examples, aspects of the operations of 1405 may be performed by a mapping component as described with reference to FIGS. 5 through 8.

At 1410, the UE may identify an operating frequency of the set of operating frequencies used to convey an SSB. The operations of 1410 may be performed according to the methods described herein. In some examples, aspects of the operations of 1410 may be performed by an operating frequency component as described with reference to FIGS. 5 through 8.

At 1415, the UE may identify a parameter of the SSB based on the operating frequency of the set of operating frequencies for conveying the SSB and a direction of a beam for conveying the SSB. In some aspects, the UE may identify the parameter based on identifying the operating frequency of the set of operating frequencies. The operations of 1415 may be performed according to the methods described herein. In some examples, aspects of the operations of 1415 may be performed by a parameter component as described with reference to FIGS. 5 through 8.

At 1420, the UE may monitor for the SSB based on the identified parameter. The operations of 1420 may be performed according to the methods described herein. In some examples, aspects of the operations of 1420 may be performed by a parameter component as described with reference to FIGS. 5 through 8.

Figure 15:
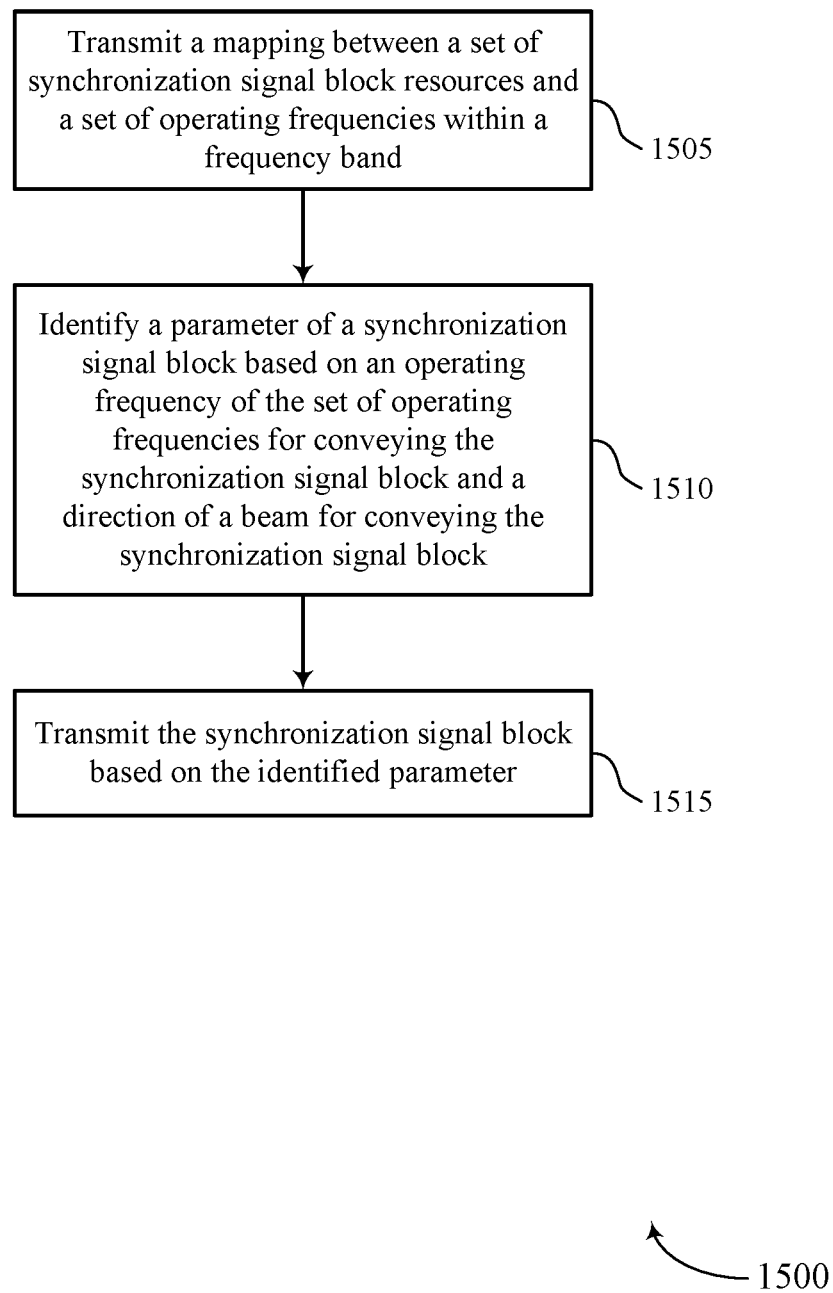

FIG. 15 shows a flowchart illustrating a method 1500 that supports SSB mapping across different frequencies in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit a mapping between a set of SSB resources and a set of operating frequencies within a frequency band. The operations of 1505 may be performed according to the methods described herein. In some examples, aspects of the operations of 1505 may be performed by a mapping component as described with reference to FIGS. 9 through 12.

At 1510, the base station may identify a parameter of an SSB based on an operating frequency of the set of operating frequencies for conveying the SSB and a direction of a beam for conveying the SSB. In some aspects, the base station may identify an index of the SSB within an SSB set based on the frequency band and the direction. The operations of 1510 may be performed according to the methods described herein. In some examples, aspects of the operations of 1510 may be performed by a parameter component as described with reference to FIGS. 9 through 12.

At 1515, the base station may transmit the SSB based on the identified parameter. In some aspects, the base station may transmit the SSB based on identifying the index. The operations of 1515 may be performed according to the methods described herein. In some examples, aspects of the operations of 1515 may be performed by an SSB component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving a mapping between a set of synchronization signal block resources and a set of operating frequencies within a frequency band; identifying a parameter of a synchronization signal block based at least in part on an operating frequency of the set of operating frequencies for conveying the synchronization signal block and a direction of a beam for conveying the synchronization signal block; and monitoring for the synchronization signal block based at least in part on the identified parameter.

Aspect 2: The method of aspect 1, wherein identifying the parameter of the synchronization signal block comprises: identifying an index of the synchronization signal block within a synchronization signal block set based at least in part on the frequency band and the direction, wherein monitoring for the synchronization signal block is based at least in part on identifying the index.

Aspect 3: The method of any of aspects 1 through 2, further comprising: identifying the operating frequency of the set of operating frequencies used to convey the synchronization signal block, wherein identifying the parameter is based at least in part on identifying the operating frequency of the set of operating frequencies.

Aspect 4: The method of any of aspects 1 through 3, further comprising: identifying the frequency band and the direction of the beam based at least in part on receiving of the mapping, wherein the identifying of the parameter is based at least in part on identifying the frequency band and the direction.

Aspect 5: The method of any of aspects 1 through 4, wherein receiving the mapping comprises: receiving the mapping from a base station, the mapping further comprising an association between the set of operating frequencies within the frequency band and parameters of synchronization signal blocks conveyed using the set of operating frequencies included in the mapping.

Aspect 6: The method of aspect 5, wherein the parameters comprise synchronization signal block indices associated with the set of operating frequencies within the frequency band.

Aspect 7: The method of any of aspects 1 through 6, further comprising: transmitting, to a base station, a message indicating the mapping, wherein the mapping further comprises an association between the set of operating frequencies within the frequency band and parameters of synchronization signal blocks conveyed using the set of operating frequencies included in the mapping.

Aspect 8: The method of aspect 7, further comprising: transmitting an indication of an operating frequency of the set of operating frequencies that is used to report beam measurements, wherein the indication is included in the message.

Aspect 9: The method of any of aspects 1 through 8, further comprising: identifying a set of reference signal resources associated with the synchronization signal block in the frequency band based at least in part on the mapping and the operating frequency; and communicating information using the set of reference signal resources.

Aspect 10: The method of aspect 9, further comprising: determining that the operating frequency of the set of operating frequencies satisfies a criterion, wherein the set of reference signal resources is associated with the operating frequency.

Aspect 11: The method of any of aspects 1 through 10, further comprising: identifying, based at least in part on the received mapping, a first gain associated with a first operating frequency of the set of operating frequencies and the direction of the beam and a second gain associated with a second operating frequency of the set of operating frequencies and a second direction of a second beam, wherein identifying the parameter is based at least in part on identifying the first gain and the second gain.

Aspect 12: The method of any of aspects 1 through 11, further comprising: transmitting a request for the mapping, wherein receiving the mapping is based at least in part on transmitting the request.

Aspect 13: The method of any of aspects 1 through 12, further comprising: identifying, based at least in part on receiving the mapping, an offset between the parameter of the synchronization signal block conveyed using a first operating frequency of the frequency band relative to a second parameter of a second synchronization signal block conveyed using a second operating frequency of the frequency band, wherein monitoring for the synchronization signal block is based at least in part on identifying the offset.

Aspect 14: The method of any of aspects 1 through 13, further comprising: communicating information using the operating frequency of the set of operating frequencies based at least in part on the monitoring for the synchronization signal block.

Aspect 15: The method of any of aspects 1 through 14, wherein the mapping is included in an SIB, a master information block (MIB), RRC signaling, DCI, or a combination thereof; and the mapping comprises an indication of one or more groups of synchronization signal blocks and one or more sets of synchronization signal blocks of the one or more groups of the synchronization signal blocks.

Aspect 16: The method of any of aspects 1 through 15, wherein the synchronization signal block is conveyed over a first set of the set of synchronization signal block resources using the frequency band.

Aspect 17: A method for wireless communication at a base station, comprising: transmitting a mapping between a set of synchronization signal block resources and a set of operating frequencies within a frequency band; identifying a parameter of a synchronization signal block based at least in part on an operating frequency of the set of operating frequencies for conveying the synchronization signal block and a direction of a beam for conveying the synchronization signal block; and transmitting the synchronization signal block based at least in part on the identified parameter.

Aspect 18: The method of aspect 17, wherein identifying the parameter of the synchronization signal block comprises: identifying an index of the synchronization signal block within a synchronization signal block set based at least in part on the frequency band and the direction, wherein transmitting the synchronization signal block is based at least in part on identifying the index.

Aspect 19: The method of any of aspects 17 through 18, further comprising: identifying the operating frequency of the set of operating frequencies used to convey the synchronization signal block, wherein identifying the parameter is based at least in part on identifying the operating frequency of the set of operating frequencies.

Aspect 20: The method of any of aspects 17 through 19, further comprising: identifying the frequency band and the direction associated with the beam based at least in part on the mapping, wherein the identifying of the parameter is based at least in part on identifying the frequency band and the direction.

Aspect 21: The method of any of aspects 17 through 20, wherein transmitting the mapping comprises: transmitting the mapping to a user equipment, the mapping further comprising an association between the set of operating frequencies within the frequency band and parameters of synchronization signal blocks conveyed using the set of operating frequencies included in the mapping.

Aspect 22: The method of aspect 21, wherein the parameters comprise synchronization signal block indices associated with the set of operating frequencies within the frequency band.

Aspect 23: The method of any of aspects 17 through 22, further comprising: receiving, from a user equipment, a message indicating the mapping, wherein the mapping further comprises an association between the set of operating frequencies within the frequency band and parameters of synchronization signal blocks conveyed using the set of operating frequencies included in the mapping.

Aspect 24: The method of aspect 23, further comprising: receiving an indication of an operating frequency of the set of operating frequencies that is used to report beam measurements, wherein the indication is included in the message.

Aspect 25: The method of any of aspects 17 through 24, further comprising: identifying, based at least in part on the mapping, a first gain associated with a first operating frequency of the set of operating frequencies and the direction of the beam and a second gain associated with a second operating frequency of the set of operating frequencies and a second direction of a second beam, wherein identifying the parameter is based at least in part on identifying the first gain and the second gain.

Aspect 26: The method of any of aspects 17 through 25, further comprising: receiving, from a user equipment, a request for the mapping, wherein transmitting the mapping is based at least in part on transmitting the request.

Aspect 27: The method of any of aspects 17 through 26, further comprising: identifying an offset between the parameter of the synchronization signal block conveyed using a first operating frequency of the frequency band relative to a second parameter of a second synchronization signal block conveyed using a second operating frequency of the frequency band, wherein transmitting the mapping is based at least in part on identifying the offset.

Aspect 28: The method of any of aspects 17 through 27, further comprising: communicating information using the operating frequency of the set of operating frequencies based at least in part on monitoring for the synchronization signal block.

Aspect 29: The method of any of aspects 17 through 28, wherein the mapping is included in an SIB, a master information block (MIB), RRC signaling, DCI, or a combination thereof; and the mapping comprises an indication of one or more groups of synchronization signal blocks and one or more sets of synchronization signal blocks of the one or more groups of the synchronization signal blocks.

Aspect 30: The method of any of aspects 17 through 29, wherein the synchronization signal block is conveyed over a first set of the set of synchronization signal block resources using the frequency band.

Aspect 31: An apparatus for wireless communication at a UE, comprising a processor; memory coupled with the processor; and instructions stored in the memory and executable by the processor to cause the apparatus to perform a method of any of aspects 1 through 16.

Aspect 32: An apparatus for wireless communication at a UE, comprising at least one means for performing a method of any of aspects 1 through 16.

Aspect 33: A non-transitory computer-readable medium storing code for wireless communication at a UE, the code comprising instructions executable by a processor to perform a method of any of aspects 1 through 16.

Aspect 34: An apparatus for wireless communication at a base station, comprising a processor; memory coupled with the processor; and instructions stored in the memory and executable by the processor to cause the apparatus to perform a method of any of aspects 17 through 30.

Aspect 35: An apparatus for wireless communication at a base station, comprising at least one means for performing a method of any of aspects 17 through 30.

Aspect 36: A non-transitory computer-readable medium storing code for wireless communication at a base station, the code comprising instructions executable by a processor to perform a method of any of aspects 17 through 30.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a mapping between a set of synchronization signal block resources and a set of operating frequencies within a frequency band;
   identifying a parameter of a synchronization signal block based at least in part on an operating frequency of the set of operating frequencies for conveying the synchronization signal block and a direction of a beam for conveying the synchronization signal block;
   identifying the frequency band and the direction of the beam based at least in part on the receiving of the mapping, wherein the identifying of the parameter is based at least in part on the identifying of the frequency band and the direction; and
   monitoring for the synchronization signal block based at least in part on the identified parameter.

2. The method of claim 1, wherein the identifying of the parameter of the synchronization signal block comprises:
   identifying an index of the synchronization signal block within a synchronization signal block set based at least in part on the frequency band and the direction, wherein the monitoring for the synchronization signal block is based at least in part on the identifying of the index.

3. The method of claim 1, further comprising:
identifying the operating frequency of the set of operating frequencies used to convey the synchronization signal block, wherein the identifying of the parameter is based at least in part on the identifying of the operating frequency of the set of operating frequencies.

4. The method of claim 1, wherein the receiving of the mapping comprises:
receiving the mapping from a base station, the mapping further comprising an association between the set of operating frequencies within the frequency band and parameters of synchronization signal blocks conveyed using the set of operating frequencies included in the mapping.

5. The method of claim 4, wherein the parameters comprise synchronization signal block indices associated with the set of operating frequencies within the frequency band.

6. The method of claim 1, further comprising:
transmitting, to a base station, a message indicating the mapping, wherein the mapping further comprises an association between the set of operating frequencies within the frequency band and parameters of synchronization signal blocks conveyed using the set of operating frequencies included in the mapping.

7. The method of claim 6, further comprising:
transmitting an indication of an operating frequency of the set of operating frequencies that is used to report beam measurements, wherein the indication is included in the message.

8. The method of claim 1, further comprising:
identifying a set of reference signal resources associated with the synchronization signal block in the frequency band based at least in part on the mapping and the operating frequency; and
communicating information using the set of reference signal resources.

9. The method of claim 8, further comprising:
determining that the operating frequency of the set of operating frequencies satisfies a criterion, wherein the set of reference signal resources is associated with the operating frequency.

10. The method of claim 1, further comprising:
identifying, based at least in part on the received mapping, a first gain associated with a first operating frequency of the set of operating frequencies and the direction of the beam and a second gain associated with a second operating frequency of the set of operating frequencies and a second direction of a second beam, wherein the identifying of the parameter is based at least in part on the identifying of the first gain and the second gain.

11. The method of claim 1, further comprising:
transmitting a request for the mapping, wherein the receiving of the mapping is based at least in part on the transmitting of the request.

12. The method of claim 1, further comprising:
identifying, based at least in part on the receiving of the mapping, an offset between the parameter of the synchronization signal block conveyed using a first operating frequency of the frequency band relative to a second parameter of a second synchronization signal block conveyed using a second operating frequency of the frequency band, wherein the monitoring for the synchronization signal block is based at least in part on the identifying of the offset.

13. The method of claim 1, further comprising:
communicating information using the operating frequency of the set of operating frequencies based at least in part on the monitoring for the synchronization signal block.

14. The method of claim 1, wherein:
the mapping is included in a system information block (SIB), a master information block (MIB), radio resource control (RRC) signaling, downlink control information (DCI), or a combination thereof; and
the mapping comprises an indication of one or more groups of synchronization signal blocks and one or more sets of synchronization signal blocks of the one or more groups of synchronization signal blocks.

15. A method for wireless communication at a base station, comprising:
transmitting a mapping between a set of synchronization signal block resources and a set of operating frequencies within a frequency band;
identifying a parameter of a synchronization signal block based at least in part on an operating frequency of the set of operating frequencies for conveying the synchronization signal block and a direction of a beam for conveying the synchronization signal block;
identifying the frequency band and the direction associated with the beam based at least in part on the mapping, wherein the identifying of the parameter is based at least in part on the identifying of the frequency band and the direction; and
transmitting the synchronization signal block based at least in part on the identified parameter.

16. The method of claim 15, wherein the identifying of the parameter of the synchronization signal block comprises:
identifying an index of the synchronization signal block within a synchronization signal block set based at least in part on the frequency band and the direction, wherein the transmitting of the synchronization signal block is based at least in part on the identifying of the index.

17. The method of claim 15, further comprising:
identifying the operating frequency of the set of operating frequencies used to convey the synchronization signal block, wherein the identifying of the parameter is based at least in part on the identifying of the operating frequency of the set of operating frequencies.

18. The method of claim 15, wherein the transmitting of the mapping comprises:
transmitting the mapping to a user equipment, the mapping further comprising an association between the set of operating frequencies within the frequency band and parameters of synchronization signal blocks conveyed using the set of operating frequencies included in the mapping.

19. The method of claim 18, wherein the parameters comprise synchronization signal block indices associated with the set of operating frequencies within the frequency band.

20. The method of claim 15, further comprising:
receiving, from a user equipment, a message indicating the mapping, wherein the mapping further comprises an association between the set of operating frequencies within the frequency band and parameters of synchronization signal blocks conveyed using the set of operating frequencies included in the mapping.

21. The method of claim 20, further comprising:
receiving an indication of an operating frequency of the set of operating frequencies that is used to report beam measurements, wherein the indication is included in the message.

22. The method of claim 15, further comprising:
identifying, based at least in part on the mapping, a first gain associated with a first operating frequency of the set of operating frequencies and the direction of the beam and a second gain associated with a second operating frequency of the set of operating frequencies and a second direction of a second beam, wherein the identifying of the parameter is based at least in part on the identifying of the first gain and the second gain.

23. The method of claim 15, further comprising:
receiving, from a user equipment, a request for the mapping, wherein the transmitting of the mapping is based at least in part on the transmitting of the request.

24. The method of claim 15, further comprising:
identifying an offset between the parameter of the synchronization signal block conveyed using a first operating frequency of the frequency band relative to a second parameter of a second synchronization signal block conveyed using a second operating frequency of the frequency band, wherein the transmitting the mapping is based at least in part on the identifying of the offset.

25. The method of claim 15, further comprising:
communicating information using the operating frequency of the set of operating frequencies based at least in part on the monitoring for the synchronization signal block.

26. The method of claim 15, wherein:
the mapping is included in a system information block (SIB), a master information block (MIB), radio resource control (RRC) signaling, downlink control information (DCI), or a combination thereof; and
the mapping comprises an indication of one or more groups of synchronization signal blocks and one or more sets of synchronization signal blocks of the one or more groups of synchronization signal blocks.

27. An apparatus for wireless communication at a user equipment (UE), comprising:
a processor,
memory coupled with the processor; and
instructions stored in the memory and operable, when executed by the processor, to cause the apparatus to:
receive a mapping between a set of synchronization signal block resources and a set of operating frequencies within a frequency band;
identify a parameter of a synchronization signal block based at least in part on an operating frequency of the set of operating frequencies for conveying the synchronization signal block and a direction of a beam for conveying the synchronization signal block;
identify the frequency band and the direction of the beam based at least in part on the receiving of the mapping, wherein the identifying of the parameter is based at least in part on the identifying of the frequency band and the direction; and
monitor for the synchronization signal block based at least in part on the identified parameter.

28. An apparatus for wireless communication at a base station, comprising:
a processor,
memory coupled with the processor; and
instructions stored in the memory and operable, when executed by the processor, to cause the apparatus to:
transmit a mapping between a set of synchronization signal block resources and a set of operating frequencies within a frequency band;
identify a parameter of a synchronization signal block based at least in part on an operating frequency of the set of operating frequencies for conveying the synchronization signal block and a direction of a beam for conveying the synchronization signal block;
identify the frequency band and the direction associated with the beam based at least in part on the mapping, wherein the identifying of the parameter is based at least in part on the identifying of the frequency band and the direction; and
transmit the synchronization signal block based at least in part on the identified parameter.

* * * * *